United States Patent
Martinez

(10) Patent No.: US 11,983,618 B2
(45) Date of Patent: May 14, 2024

(54) COMPUTING SYSTEM AND METHOD FOR DETERMINING MIMICKED GENERALIZATION THROUGH TOPOLOGIC ANALYSIS FOR ADVANCED MACHINE LEARNING

(71) Applicant: OHIO STATE INNOVATION FOUNDATION, Columbus, OH (US)

(72) Inventor: Aleix Martinez, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 361 days.

(21) Appl. No.: 17/599,255

(22) PCT Filed: Apr. 8, 2020

(86) PCT No.: PCT/US2020/027259
§ 371 (c)(1),
(2) Date: Sep. 28, 2021

(87) PCT Pub. No.: WO2020/210351
PCT Pub. Date: Oct. 15, 2020

(65) Prior Publication Data
US 2022/0180154 A1    Jun. 9, 2022

Related U.S. Application Data

(60) Provisional application No. 62/833,368, filed on Apr. 12, 2019.

(51) Int. Cl.
*G06N 3/047* (2023.01)
*G06F 18/214* (2023.01)
(Continued)

(52) U.S. Cl.
CPC ......... *G06N 3/047* (2023.01); *G06F 18/2148* (2023.01); *G06F 18/24* (2023.01); *G06N 7/01* (2023.01)

(58) Field of Classification Search
CPC .......... G06N 3/047; G06N 7/01; G06N 3/084; G06N 3/04; G06F 18/2148; G06F 18/24
See application file for complete search history.

(56) References Cited

U.S. PATENT DOCUMENTS 9,224,067 B1 * 12/2015 Lu ...................... H04L 63/1408
10,515,366 B1 * 12/2019 Gorelik ............. G06Q 20/4016
(Continued)

OTHER PUBLICATIONS

Zugner, Daniel, Amir Akbarnejad, and Stephan Günnemann. "Adversarial attacks on classification models for graphs." arXiv preprint arXiv:1805.07984 (2018).*
(Continued)

*Primary Examiner* — Xuemei G Chen
(74) *Attorney, Agent, or Firm* — Meunier Carlin & Curfman LLC

(57) ABSTRACT

Advancing beyond Interpretability and explainability approaches that may uncover what a Deep Neural Network (DNN) models, i.e., what each node (cell) in the network represents and what images are most likely to activate the model provide a mimicked type of learning of generalization applicable to previously unseen samples. The approach provides an ability to detect and circumvent adversarial attacks, with self-verification and trust-building structural modeling. Computing systems may now define what it means to learn in deep networks, and how to use this knowledge for a multitude of practical applications.

15 Claims, 17 Drawing Sheets

(51) Int. Cl.
*G06F 18/24* (2023.01)
*G06N 7/01* (2023.01)

(56) References Cited

U.S. PATENT DOCUMENTS

| | | | |
|---|---|---|---|
| 2010/0161793 A1* | 6/2010 | Young Hwan | G06F 15/16 709/224 |
| 2015/0088024 A1* | 3/2015 | Sackellares | A61B 5/291 600/544 |
| 2016/0110642 A1 | 4/2016 | Matsuda et al. | |
| 2017/0017793 A1 | 1/2017 | Davis et al. | |
| 2017/0187747 A1 | 6/2017 | Huston | |
| 2018/0197069 A1* | 7/2018 | Reimann | G06N 3/08 |
| 2019/0080089 A1* | 3/2019 | Chen | G06N 20/10 |
| 2019/0377976 A1* | 12/2019 | Markram | G06V 10/764 |
| 2019/0377999 A1* | 12/2019 | Markram | G06N 3/08 |
| 2019/0378000 A1* | 12/2019 | Markram | G06N 3/086 |
| 2019/0378007 A1* | 12/2019 | Markram | G06N 3/082 |
| 2019/0378008 A1* | 12/2019 | Markram | G06N 3/044 |
| 2020/0143240 A1* | 5/2020 | Baker | G06N 3/045 |
| 2020/0226425 A1* | 7/2020 | Zhang | G06F 18/217 |
| 2020/0304285 A1* | 9/2020 | Hess | G06N 3/08 |
| 2021/0027182 A1* | 1/2021 | Harris | G06N 20/20 |
| 2021/0049441 A1* | 2/2021 | Bronstein | G06N 3/045 |
| 2021/0185066 A1* | 6/2021 | Shah | G06N 3/08 |
| 2021/0382691 A1* | 12/2021 | Kim | G06F 7/5443 |

OTHER PUBLICATIONS

Akhtar et al. "Threat of Adversarial Attacks on Deep Learning in Computer Vision: A Survey," Journal of Lat E X Class Files, vol. PP, Aug. 2017, 21 pages.
Ferri. "Persistent topology for natural data analysis—A survey," arXiv:1706.00411v2[math.AT] Aug. 18, 2017, [retrieved on Jul. 26, 2020]. Retrieved from the Internet: <URL: https://arxiv.org/pdf/1706.00411.pdf> 18 pages.
Zhang. "Detection and Mitigation of Security Threats in Cloud Computing," Princton University, 2017 ([retrieved on Jul. 26, 2020]. Retrieved from the Internet: <URL:http://palms.ee.princeton.edu/system/files/thesis.pdf> 50 pages.
Written Opinion of the International Searching Authority for International Application No. PCT/US2020/027259 dated Aug. 10, 2020, 5 pages.
International Search Report for International Patent Application No. PCT/US2020/027259 dated Aug. 1, 2020, 4 pages.

* cited by examiner (a)

COMPUTING SYSTEM AND METHOD FOR DETERMINING MIMICKED GENERALIZATION THROUGH TOPOLOGIC ANALYSIS FOR ADVANCED MACHINE LEARNING

BACKGROUND

The term Deep Neural Networks (DNNs) signify a form of computing structure which has enough capacity to employ machine-learning from very large datasets, and to do so without the need to define hand-crafted features, models or hypotheses for every problem to which such computing tools may be input with.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

It is to be appreciated that mimicked generalization through topologic analysis for advanced machine learning applications is an issue entirely within a technical computing environment. No consistent systematic manner of doing this exists in a purely "pen and paper" sense, so even the "mere automating" of these tasks may have been considered unapproachable outside of a technical computing environment. With this innovation, augmentation beyond mere automation includes creating components for a system whose functionality is currently not captured, and not possible, in most any manual process.

In another embodiment, a non-transitory computer-readable medium configured to store instructions, that when executed by a processor, perform operations including one or more of the system and method steps.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
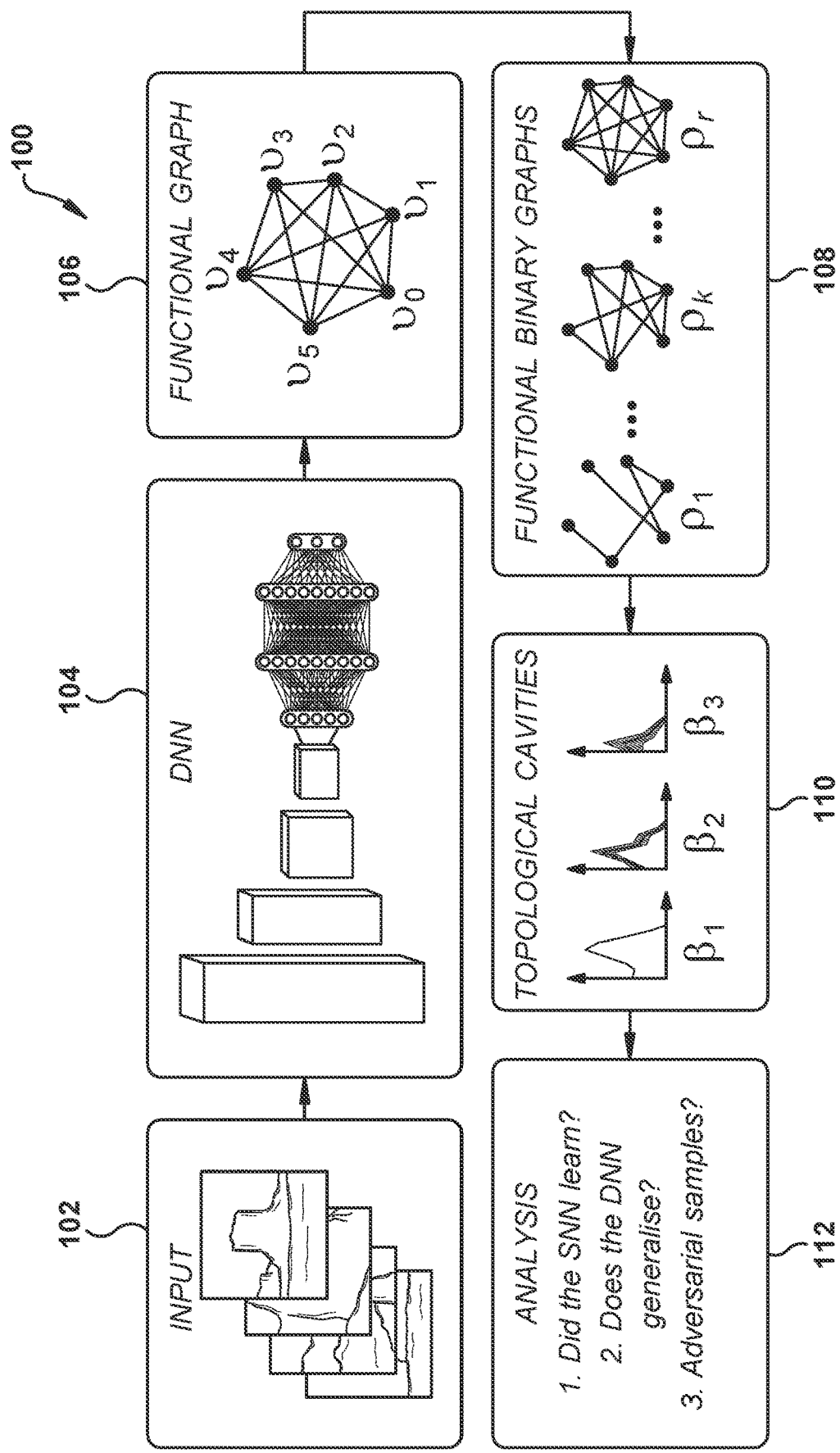
FIG. 1, illustrated is a descriptive flowchart relating an overview 100 of aspects of the disclosed innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

While specific characteristics are described herein, it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, the claimed subject matter can be implemented as a method, apparatus, or article of manufacture using programming or engineering techniques to produce software, firmware, hardware, or any combination thereof to control a computer to implement the disclosed subject matter. The term "article of manufacture" as used herein is intended to encompass a computer program accessible from most any computer-readable device, carrier, or media. It is appreciated that embodiments are presented as a specific, non-limiting, examples of the innovation. Other embodiments are contemplated as well and intended to be included within the scope of this disclosure and claims appended hereto.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The disclosed innovation is contemplated to be provided in other implementations (for example, as a dedicated hardware Application-Specific Integrated Circuit "ASICs"), although not shown.

This has revolutionized computer vision and other areas of Artificial Intelligence (AI). In recent years, high capacity DNNs have outperformed many other machine learning algorithms in a number of applications like object recognition and speech recognition, especially when large labeled datasets and/or means of obtaining information from large datasets were available. It is to be appreciated that current DNNs do fail, and where and why DNNs fail remains a mystery for conventional DNNs. To solve this problem, researchers are trying to understand what DNNs do. Two approaches are interpretability and explainability, with an emphasis on defining what the nodes (cells) of the network represent and how they respond to different inputs. For example, DNNs used in object recognition generally learn to extract low-level, Gabor-like features in the first layers, combine these low-level features to represent parts of an object in mid-level layers, and finally combine those to generate highly complex representation of objects that are invariant to image changes, e.g., pose, illumination and affine transformations. Another group of methods focuses on the analysis of these features. One way is by exploring the semantic meaning of filters or computing feature distributions of different attributes. Saliency maps, heatmaps, sensitivity maps, and attention maps display class relevant information that is used by the model to make its predictions.

Using high-capacity DNNs to employ machine-learning from such huge datasets, however, does not necessarily inform a user how a computing network "learns" what the network has actually learned, or "why" the machine-learning (or a plurality of collected machine-learning algorithms) has provided the output (or showing of that which the system has learned). This problem is called a "black-box" problem, and has resulted in a lack of trust—and for good reason. Computing systems, even (and especially) computing systems that handle inputs at a level that no human could handle, are susceptible to a number of problems that inhibit adoption; including being tricked, as well as merely employing a "memorization" style of "learning" that would pose severe problems once a computing system is put into general use (after use of training set data). For such computing systems to be entrusted and let run without strict oversight (and to meet the full potential of such human-free systems), further innovation is needed. The ability to have the computing system evaluate its own identified, specific deep representations, and evaluate whether one such specific or another representation would be more appropriate (and appropriate according to a set of rules that reflect better machine-learning) provides a rich area of innovation. Going beyond methods that may provide interpretability and explainability, the disclosed innovation may provide the ability to configure computing structures that provide more than just a DNN that has learned, but also structure as to how and why it "learned" what it has learned.

Computer systems are often analogized to biologic systems. Innovation has striven to create artificial intelligence, and analogized that intelligence to a human brain. Machine learning has been called an application of artificial intelligence that provides an electronic computing system the ability to automatically learn and improve from experience without being explicitly programmed. Thus, terms such as "application" and "function" are used in a context to indicate that the innovation is directed to more than simply math, as a human may do in their mind or with a pen and paper, but to a technical application that provides improved computing systems. Aside from any such use of literary analogies, computing systems are not biologic (or living) and are not living in the sense that humans are. Computing systems are not abstract, but are real—and deal with real machines and systems. Machine learning concerns computing solely in a technical environment to which problem situations are structured through models, and practical applications are configured within the computing systems so created. Data structures associated with machine learning are distinct from the manner in which a human thinks, and the processing of data structures associated with machine learning is not an exercise in abstract thinking, nor divorceable from the technical environment.

Machine learning systems often must deal with data at volumes and speeds that the term "mere automation" does not apply in the sense that a machine is merely doing that which a human may do (this is commonly referred to as "Big Data"). As Big Data has become more usual in technical efforts, traditional techniques that may seek to apply simple statistical methods have encountered limitations in the art. Machine learning applications provide some means to overcome limitations with flexibility of modeling and creating data structures to reflect that modeling. It is to be appreciated that improvements in analysis, predictive performance, augmented feature engineering of technical systems may be advanced with fast and efficient machine learning techniques. Not only has machine learning applications proliferated, the complexity of machine learning applications also proliferates, creating issues with among other things, input to output traceability. The growing complexity and difficulty to understand, follow, or interpret the computing results leads to a black-box condition that obscures the ability to develop a computing system with mimicked generalization through topologic analysis for advanced machine learning and robust external manipulation and error proofing otherwise unavailable with such technical tools. The framework and techniques of the present innovation disclosed in this application provide practical applications for these issues. The technical reality does not limit the usefulness of referring to computing systems with anthropic terms, especially in discussing systems involved with machine learning and improvements to machine learning systems which may include (but not be limited to) actions that computers may long been incident to, such as the individual (single, and not yet put into an ordered combination) elements that courts have indicated to be "directed to" abstract ideas. It is to be appreciated that ordered combinations of individual elements provide innovation that merits patent protection. In that light, even though machines and systems of machines, and critically, innovations concerned with machines and systems of machines are often much more easily grasped and understood when anthropic terms are used, terms like "learning," "predicting," "determining" and the like are to be understood in their technical sense in this application.

With reference now to the figures, FIG. 1, illustrated is a descriptive flowchart relating an overview 100 of aspects of the disclosed innovation. At 102, inputs may be received by a DNN. It is to be appreciated that inputs may be a number of different items based on a particular practical application to which a DNN is being utilized. At 102, pictures of various items are illustrated. At 104, a graphical illustration of a DNN processing is illustrated. It is to be appreciated that the illustration at 104 is portrayed in general only, and shows both "silos" as well as nodes and connections. At 106, illustrated is a sample functional graph, with points and lines between points. It is to be appreciated that these items will be discussed in greater detail herein. At 108, illustrated are a series of functional binary graphs, which illustrate several modes of particular functional graph mappings and reveal, as a binary aspect, whether particular points are connected to other particular points. At 110, illustrated is a set of topological cavity graphs for a series of Bette numbers. This illustration will be discussed in more detail herein. At 112, a practical application is illustrated for aspects of the innovation in the form of types of questions that the disclosed innovation may provide answers to with its methods and particular computing structure. Given a DNN, its functional graph is defined by the correlation of activation of distant nodes. Applying topologic principles, the disclosed innovation provides a computed set of binary graphs that define local and global topological properties of the network (as will be discussed herein in relation to Algorithm 1). Global topological properties may define generalization, while local properties may identify overfitting (as will be discussed herein in relation to Algorithm 2). It is to be appreciated that another aspect of the innovation is that these topological properties may be used to detect adversarial attacks.

It is to be appreciated that Deep Neural Networks (DNNs) have enough capacity to learn from very large datasets, without the need to define handcrafted features, models or hypotheses for every problem, which has revolutionized computer vision and other areas of Artificial Intelligence (AI). Such computing systems however remain open to innovation. For example, using high-capacity DNNs to learn from huge datasets may not tell us how such a network learns what it does and why. This may create the so-called "black-box" problem, and has resulted in a lack of trust for computing systems and applications of computing systems. It is to be appreciated that aspects of the disclosed innovation provide practical applications towards resolution of these shortcomings.

Interpretability and explainability methods, as may be known in the art, may provide some insight to what a DNN has learned, but not how and why it learned it. For example, Interpreting or explaining may not provide why a given DNN identified a specific deep representation as more appropriate than other possible representations. Being able to know what type of image activates a specific node (cell) of a network, which may be attempted with DeepDream as is known in the art; or being able to generate plausible class output images, which may be attempted with optimizing softmax and related objectives as is known in the art, may not be enough to inform how and why these deep features (representations) were chosen by the network and where they may fail.

The disclosed innovation, by going beyond mere interpretability and explainability, improves on the manner of determining how a DNN learns, as well as improves that learning by the available manner of trail-and-error, which conventionally is slow and does not solve the trustability problem). Further, lacking an understanding of why DNNs learn a specific or particular deep representation or model (as DNN's may incorporate many such internal representations and models), one may be unable to determine where and why such a network fails (as may occur in a failure mode of succumbing to an adversarial attack). Relatedly, lacking such method and computing structure as the disclosed innovation provides, one may be unable to detect and circumvent such an adversarial attack. Thus, it is to be appreciated that a practical application is to provide a computing structure robust against adversarial attacks that most any conventional DNN may not withstand.

As will be disclosed herein, an aspect of the innovation provides a practical application of algebraic topology, from which a set of algorithms may be derived in order to help address shortcomings as noted. This aspect of the innovation provides more than merely using either local or global aspects of a DNNs as simple local properties of the network (e.g., the degree of a node) as well as global properties (e.g., the path length between nodes) are insufficient to explain how and why DNNs learn.

The disclosed innovation shows how topological properties (e.g., n-cliques and nD holes) captured from the network functioning may describe how a DNN learns. These configured properties may demonstrate an ability to predict successful learning (as described herein) as well as when and why a DNN may be likely to misclassify a previously unseen sample (as will be discussed in relation to Algorithms 1 and 2). As noted, another practical application is that embodiments of the disclosed innovation may successfully detect adversarial attacks.

It is to be appreciated that going beyond conventional approaches of interpretability and explainability, one may apply a different approach and ask, instead, what does it mean to learn in DNNs? The disclosed innovation takes such a different approach and applying topological concepts, evaluates network structure evolution during a learning process, and applies this knowledge to know where the network has successfully learned and where it will fail.

It is to be appreciated that many practical applications are afforded by this innovation. The ability to improve DNNs to: i) increase trust; ii) facilitate transferability to other problems, e.g., use a network pre-trained on a specific problem in a different problem setting, or improving the robustness of a DNN; iii) predict where a network is likely to work and where it will most probably fail; iv) help researchers and practitioners design better networks, derivable from knowing what works and what does not; v) derive unsupervised learning algorithms (being able to apply what the network needs to do to generalize to unseen samples); and vi) better prepare DNNs for fair and ethical decision makings (i.e., unbiased performance) are possible practical applications.

Turning now to FIG. 2, illustrated are several topological tools utilized by the disclosed innovation. At FIG. 2A (or "(a)"), examples of a 0-clique (a point or node of a graph), 1-clique (two nodes connected by a 1D undirected edge), 2-clique (three nodes connected by the 1D edges and 2D faces filling in the space between the edges), and 3-clique (four nodes connected by their 1D edges, 2D faces, and a 3D solid filling in the space between the faces) are illustrated. These simplicies correspond to topological realization of a 0-clique, 1-clique, 2-clique, and 3-clique, respectively. It is to be appreciated that a n-clique defines a nD space.

Figure 2A:
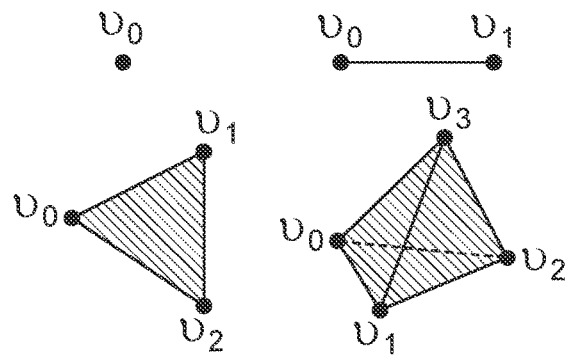
FIGS. 2A through 2E illustrate several topological tools utilized by the disclosed innovation.
Figure 2B:
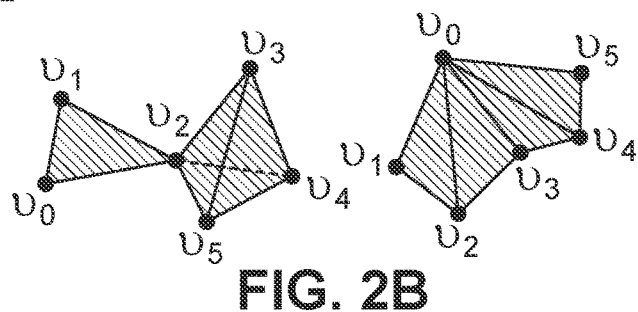
Figure 2C:
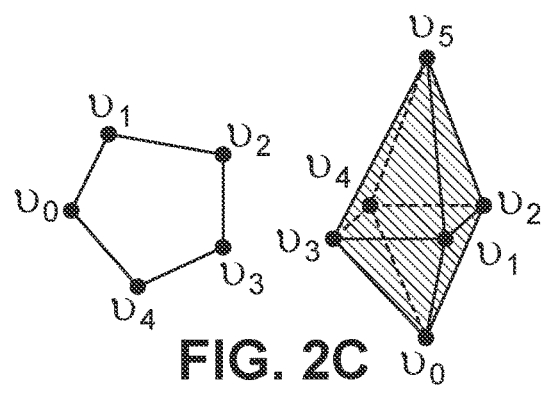
Figure 2D:
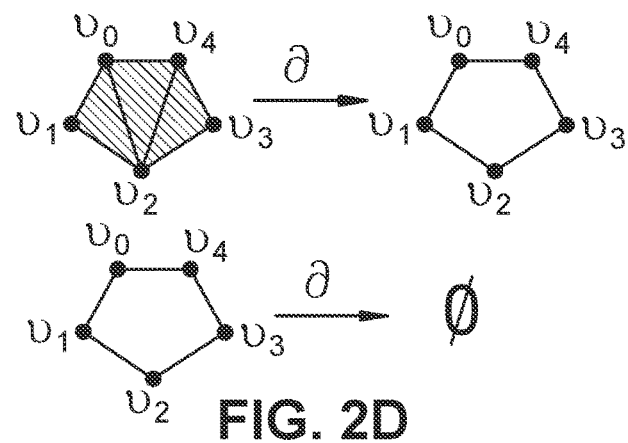
Figure 2E:
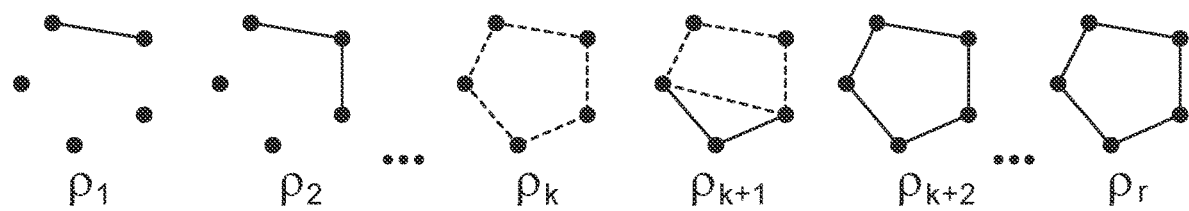

At FIG. 2B (or "(b)"), examples of clique complexes are illustrated: cliques may glue on common faces to form topological objects. At FIG. 2C (or "(c)"), example cavities in the topological space are illustrated. Illustrated at FIG. 2D (of "(d)"), are a boundary operator of a chain surrounding a clique complex (top) and a cavity (bottom). It is to be appreciated that these topological features and persistent homology may detect birth and destruction of a cavity (shown with dashed line) during the mapping of a weighted graph onto binary graphs (as will be discussed in relation to Algorithm 1), as illustrated in FIG. 2E (or "e").

The approach of the disclosed innovation is to take the structure of a DNN to be generally defined by a weighted graph. Similarly, the "behavior" of a DNN (i.e., the activation of its nodes) are given by a functional graph, i.e., the correlations between the activation of each pair of nodes. Configuring the computing structure based on this approach and using topological changes of functional graphs during training and testing provides for aspects of the innovation. It is to be appreciated that by rule, "learning" is to be considered better as the evolving structure of a network that generalizes to unseen testing samples can be captured with a convergence to a common topology, and that this topology is differential from that of networks that fail to generalize. By using topological tools, the disclosed innovation may determine whether an unseen testing sample will be correctly analyzed by the network and when it will not.

In an embodiment demonstrating this improvement, a focus may be provided on adversarial attacks. Let $G=(V,E)$ be an undirected graph that consists of a pair of finite sets $(V,E)$, where the elements $v_i$ of V are called the vertices, and the elements $e_{ij}$ of E are called the edges. A n-clique, $\sigma \subset G$ is a subset of n+1 vertices of G that are connected to each other, and n is the degree of the clique. Any subgraph $\phi \subset \sigma$ of a n-clique is itself a clique of lower degree and is called a face of that clique. A clique that is not a face of a clique of larger degree is called a maximal clique. The clique complex of a graph G is the collection of all its cliques, $S(G)=\{S_0(G), S_1(G), \ldots S_n(G)\}$, where $S_k(G)$ is the set of all (k+1)-cliques in G. Thus, it is to be appreciated that a clique complex defines a topological space.

The geometric realization of this topological space may be considered to be an object. As noted above, a few examples of such objects are shown in FIG. 2A. As seen in this figure, a 0-clique is realized by a single node, a 1-clique by a line segment (i.e., edge) connecting two nodes, a 2-clique is the filled triangle that connects three nodes (i.e., the three edges of the three nodes define a filled triangle, that is, a 2D face), and the like. The geometric realizations of cliques in a clique complex intersect on common faces forming a well-defined object as shown in FIG. 2(b). Correlation activation of nodes in a DNN is defined as such topological objects as those illustrated in FIG. 2(a-c).

In an embodiment, the topological properties of these objects may be used to compute homology of the evolving DNN, and methods of applied algebraic topology are applied to distinguish and count cavities related to subject topological objects, and the application of such structural changes provides for disclosed practical applications.

It is to be appreciated that in discussing homology and cavities of the computing structures, that embodiments may contain a plurality of characteristics. A chain complex C(S) of a clique complex is defined to be the sequence $\{C_n(S, \mathbb{F}_2)\}_{n \geq 0}$ (abbreviated $C_n$), with $C_n$ the $\mathbb{F}_2$-vector space whose bases are the (n+1)-cliques $\sigma \in S_n$, $\forall_n \geq 0$, and $\mathbb{F}_2=\{0, 1\}$. In other words, the elements of $C_n$ are interconnections of (n+1)-cliques in S. For example, elements of $C_1$ are linear combinations of edges (2-cliques) and elements of $C_2$ are linear combinations of filled triangles (3-cliques, i.e., 2D faces).

For each n≥1, there exist a linear transformation called a boundary operator that maps $C_n$ onto a lower dimensional chain complex:

$$\partial_n : C_n \to C_{n-1}, \quad (1)$$

with:

$$\partial_n(\sigma_{0,1,\ldots,n}) = \sum_{k=0}^{n} \sigma_{0,1,\ldots,k-1,k+1,\ldots,n}. \quad (2)$$

Applying the tools of geometric topology, the boundary of a n-clique is the set of (n−1)-cliques bordering it. FIG. 2(d) shows an example.

Figure 3:
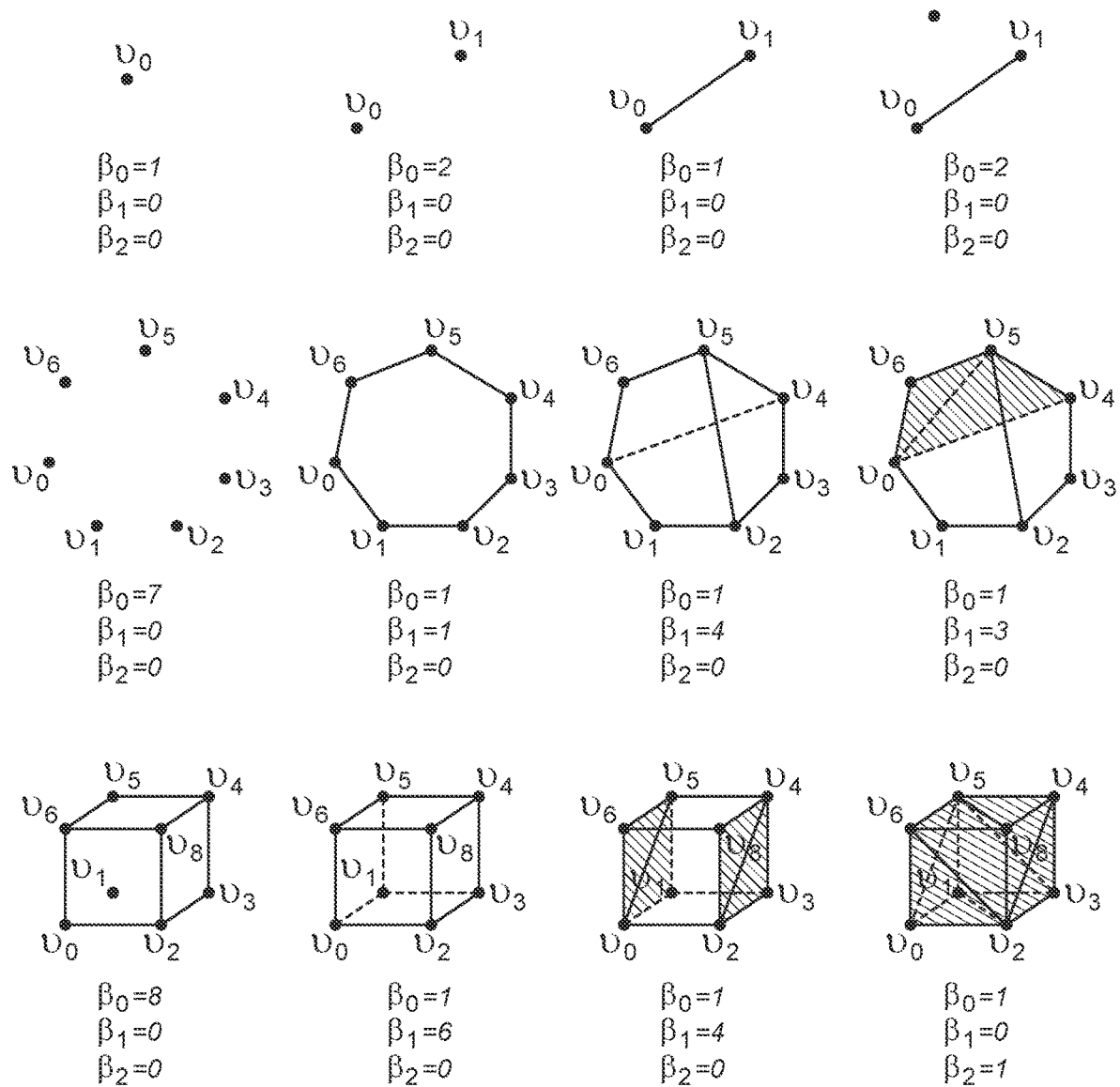
FIG. 3 illustrates an embodiment of the innovation is presented.

Turning now to FIG. 3, an illustration of an embodiment of the innovation is presented. Betti numbers are sequences of natural numbers used to count cavities of a topological object in a corresponding dimension. Low dimensional Betti numbers have intuitive interpretation: $\beta_0$ counts connected components, $\beta_1$ counts 2D cavities, and $\beta_2$ counts 3D cavities. Several examples of clique simplices and corresponding Betti numbers are disclosed herein. By adding edges, lower dimensional cavities are destroyed while higher dimensional cavities are formed. For example, a first cavity $l_0=(v_0, v_1, \ldots, v_6)$ is formed (FIG. 3, middle row, second column), by adding two edges $(v_2, v_4)$ and $(v_0, v_4)$, which provides that four new cavities appear $l_1=(v_0, v_4, v_5, v_6)$, $l_2=(v_0, v_1, v_2, v_3, v_4)$, $l_3=(v_2, v_3, v_4, v_5)$ and $l_4=(v_0, v_1, v_2, v_5, v_6)$ (FIG. 3, middle row, third column).

A geometrical realization of a clique is defined as including all the enclosed space between the nodes (simplices). Adding another edge $(v_0, v_5)$ thus fills $l_1$, thus $\beta_1$ drops to 3. It is to be appreciated that in the provided example figure, some edges are dashed for facilitating visualization. Hence a boundary operator takes a collection of n-cliques and maps them to their boundary, i.e., a collection of (n−1)-cliques.

Similarly, a n-cycle is a path in (as seen in the graph) that forms closed structures, e.g., $v_1 \to v_2 \to v_3 \to v_1$. Since a boundary of any clique is a cycle, the boundary operator provides a mechanism to compute cycles. Formally, a n-cycle is given by any element $l \in C_n$ that satisfies $\partial_n(l)=0$, as shown in FIG. 2(d).

Continuing in the embodiment, one may call a subset of n-cycles, $k(\partial_n)$. Further, one may let the n-cycle that defines the boundary of $C_n$ be $b(\partial_n)$. It is to be appreciated that two n-cycles, are equivalent if their sum in $\mathbb{F}_2$ defines the boundary of a path of n+1 vertices, i.e., a (n+1)-chain. Formally, we define this homology of dimension n as, $$H_n(S, \mathbb{F}_2) = k(\partial_n)/b(\partial_{n+1}) \quad (3)$$

for n≥1, and $$H_0(S) = C_0/b(\partial_1) \quad (4)$$

Therefore, $H_n$ defines a vector space spanned by a class of n-cycles. Its dimensionality is the number of nontrivial n-cycles; i.e., the number of (n+1)-dimensional cavities in the objects (as can be seen in graphs, for example, in FIG. 2(c)). In this manner, a cavity may be defined as a non-filled face of dimensionality n, (as shown in the example of FIG. 2(d)).

Since cycles are chain complexes that map to ∅ by the boundary operator, cavities are the nullspace of this boundary operator, $\text{null}(\partial_n) = k(\partial_n) \subset C_n$.

It is to be appreciated that in the above discussion concerning cliques in DNNs, a topological tool of binary graphs, i.e., in $\mathbb{F}_2$ can be defined. In an embodiment, weighted graphs may compute most all the possible binary graphs. An example approach to achieve this is as follows. Let $G=(V,E)$ be the graph defining a DNN under evaluation, and $X=\{x_i, y_i\}_{i=1}^{m}$ defines the labeled training samples of the DNN, with m the number of samples, $x_i \in \mathbb{R}^p$, and $y_i \in \mathbb{Z}$ in classification and $y_i \in \mathbb{R}^q$ in regression (q≥1). Passing the sample vectors $x_i$ through the network (i=1, \ldots, m), provides a computed correlation $c_{ij}$ between an activation $(a_i, a_j)$ of each pair of nodes $(v_i, v_j)$ of G. That is given by, $$c_{ij} = \frac{m(m-1)}{2} \sum_{i=1}^{m-1} \sum_{j=i+1}^{m} \frac{(a_i - \mu_{a_i})(a_j - \mu_{a_j})}{\varsigma_{a_i}\varsigma_{a_j}}, \quad (5)$$

where $\mu$ and $\zeta$ indicate the mean and standard deviation over X.

Let us now order the absolute values of these correlations from largest to smallest: $|c_{i_1j_1}| \geq |c_{i_2j_2}| \geq \ldots \geq |c_{i_rj_r}| > T$, r the number of correlations larger than T in G given X, written corr(G|X,T). In this notation, the subscripts of each correlation indicate the node pairs in that correlation: $v_{i_1}, v_{j_1}), \ldots, (v_{i_r}, v_{j_r})$.

Binary graphs are obtained by iteratively adding a node pair at a time. In an embodiment, one may start by adding nodes with a largest correlation, $(v_{i_1}, v_{j_1})$, and continue adding node pairs up to the last one, $(v_{i_r}, v_{j_r})$.

The number of edges included in a binary graph is defined as its density, $\rho_k = k/$number of non-zero correlations; the number of non-zero correlations is computed as the number of $|c_{ij}| > 0, \forall_i$ and j>i. Thus, in an embodiment, the density of the binary graph will increase at each iteration (as we add more and more nodes). This method provides an investigatory tool to capture how the homology of the graph defining the DNN of interest evolves as a function of the density (as can be seen in example FIG. 2(e)).

This approach is summarized in Algorithm 1 (below). In the embodiment, the algorithm maps a DNN defined by a weighted graph onto the set of binary graphs $\{G_1, \ldots, G_r\}$. It is to be appreciated that these binary graphs are topological objects as shown in FIG. 2.

Algorithm 1 Weighted to binary graph mapping:

---

Algorithm 1 Weighted to binary graph mapping.

1: Let G = (V, E), X = $\{x_i, y_i\}_{i=1}^m$, and define T > 0.
2: Let corr(G|X, T) = $\{|c_{i_1j_1}|, |c_{i_2j_2}|, \ldots, |c_{i_rj_r}|\}$, s.t. $|c_{i_1j_1}| \geq |c_{i_2j_2}| \geq \ldots \geq |c_{i_rj_r}| > T$.
3: Let $G_0 = \emptyset$ and k=0.
4: repeat
5: k = k + 1.
6: $G_k = G_{k-1} \cup \{v_{i_k}, \hat{e}_{ij}v_{j_k}\}$, with $\hat{e}_{ij}$ the undirected edge defining $v_{i_k} - v_{j_k}$.
7: $\rho_k$ = k/r.
8: until k = r.

---

It is to be appreciated that with the method of algorithm 1, any topological property of a DNN given X may be computed as a function of learning. An analysis may be started with the number of n-cliques. An illustration of an example may be used with a tool known in the art known as LeNet, which is a historical network that may be used here as a proof-of-concept. This network was originally derived to recognize written digits, i.e., 0-10. An embodiment may use the IV1NEST dataset, consisting of 60,000 training images and 10,000 test images, as X.

Figure 4A:
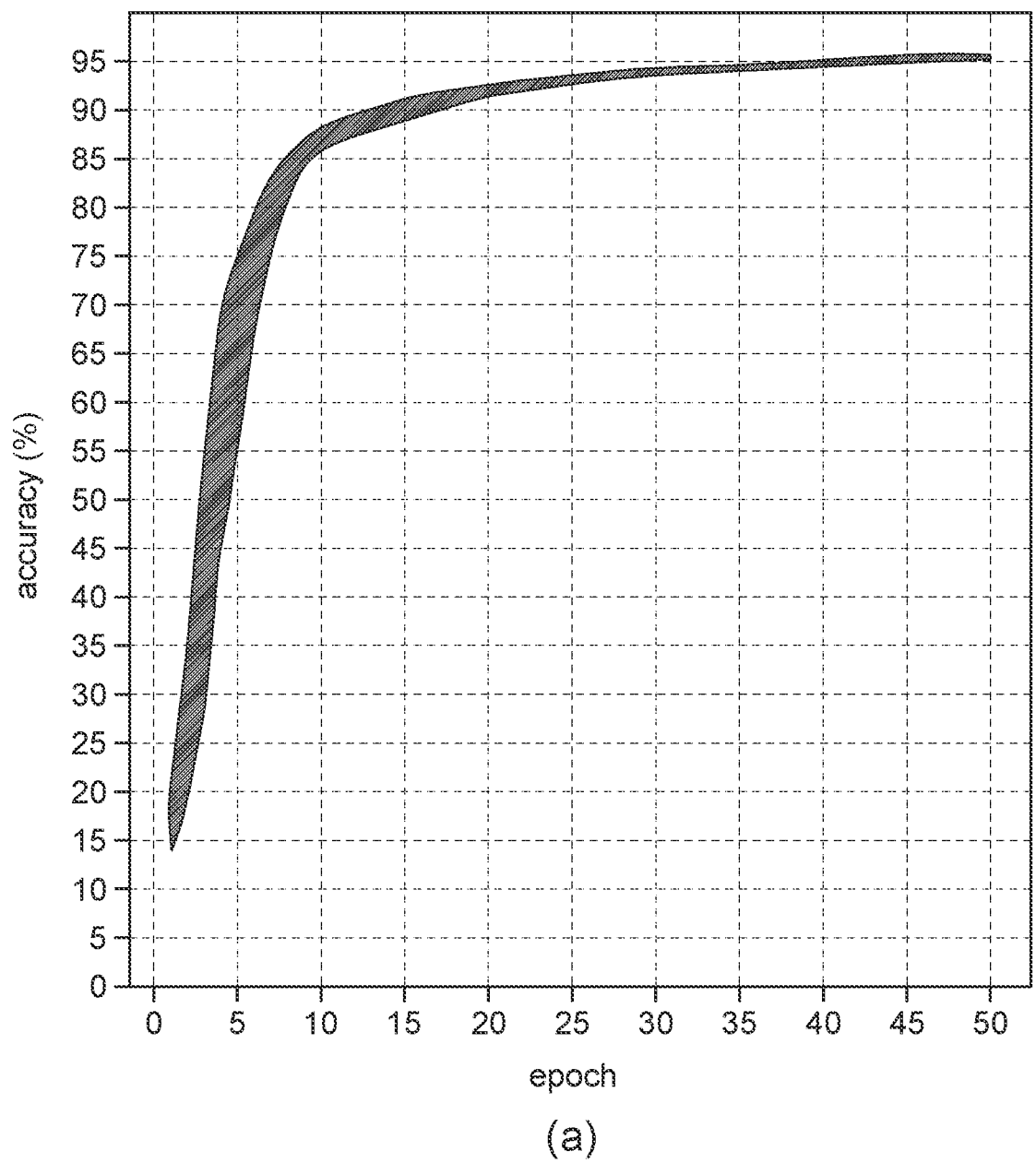
FIGS. 4A and 4B provide illustrations of cross-validation (CV) classification accuracy of a provided example.
Figure 4B:
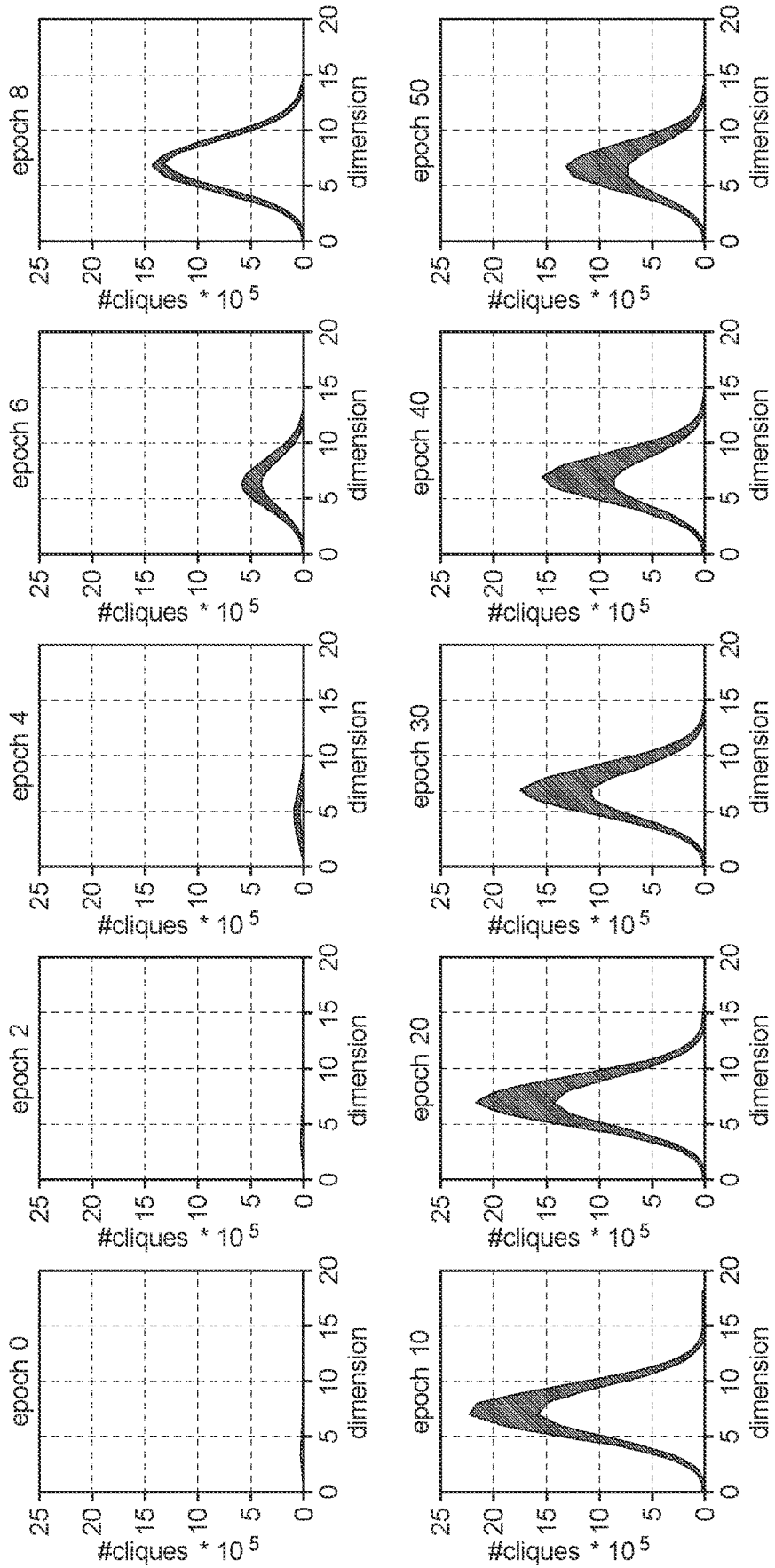

Turning now to FIG. 4A, a cross-validation (CV) classification accuracy of this network is shown, where the x-axis defines the epoch and the y-axis the 5-fold CV accuracy, with the thickness of the curve defining a variance over this CV procedure. Given the graph of LeNet $G_{LeNet}$ and the training set X, algorithm 1 may be applied to obtain $G_k$ s.t. $\rho_k$=0.25. The number of n-cliques (n∈$[^{0,20}]$) in $G_k$ are shown in FIG. 4(b), where each plot represents the results at an indicated epoch, the x-axis specifying the value of n, and the y-axis specifying the number of n-cliques. It is to be appreciated that the number of n-cliques in an untrained DNN must be zero or very close to zero. That is because the number of nodes working together (i.e., correlated, as given by $c_{ij}$) before any training is performed must be zero or tiny. This is shown in the first plot of FIG. 4(b). But as the network learns, as shown in the epochs of the graph, the nodes start to work together to solve the problem of mapping $x_i$ onto y. It is to be appreciated in this example that by the time the learning process has made its major gains (by about epoch 10), the number of n-cliques is maximum. As the learning process continuous tightening the knobs of the network (i.e., adjusting its parameters), the number of cliques starts to decrease. This indicates a result of overfitting to X.

Continuing in the embodiment, the topological tool of cavities in DNNs is illustrated. A rank of the n-homology group $H_n$ a topological space is defined as the $n^{th}$ Betti number. In other words, Betti numbers may compute the maximum amount of cuts that are to be made to separate a surface into two k-cycles, k=1, 2, . . . . Hence, the first Betti number, $\beta_0$, computes the number of connected elements in S(G); the second Betti number, $\beta_1$, calculates 1D cavities (or holes); $\beta_2$ gives the number of 2D cavities; and, more generally, $\beta_n$ computes the number of nD cavities (as shown in FIG. 3).

It is to be appreciated that FIGS. 4A and 4B provide an example testing of accuracy for an example LeNet training on MNIST (FIG. 4A) versus the number of cliques (FIG. 4B), with mean and standard deviation given by 5-fold cross-validation.

Returning to FIG. 3, it is to be appreciated that all kD faces of the simplicies of a n-clique are filled, e.g., see the last object in the second row and the last two in the last row in FIG. 3; noting how these kD faces eliminate cavities of lower dimensionality and add cavities of higher dimensionality. To further clarify this point, consider a second example as shown in the second row in FIG. 3. A functional representation of the example DNN indicates that node $v_0$ and $v_1$ work together to solve the classification or regression problem the network had been tasked to address, i.e., their activation patterns are highly correlated (as can be revealed with algorithm 1). Similarly, $v_i$ and $v_{i+1}$ (i=1, . . . , 6) and $v_6$ and $v_0$ also work together to solve the problem the network is faced with. This creates a 1D cavity, $\beta_1$=1, because ∂ maps this chain to 0. But if $v_0$ and v4 and $v_0$ and $v_5$ are also highly correlated, this forms cliques with filled simplicies, yielding two additional 1D cavities, $\beta_1$=3; as shown in the last objects in the second row in FIG. 3.

The Betti numbers of a clique complex S of a graph G are formally given by, $$\beta_n(S) = \text{null}(\partial_n) - \text{rank}(\partial_{n+1}). \quad (6)$$

Note that in order to compute $\beta_n$, the null space and the rank of the matrix formed by cliques of dimension n and dimension n−1 are captured, only computing cliques in the first n dimensions to calculate $\beta_1, \ldots, \beta_n$. It is to be appreciated that since, in most DNNs, $\beta_n$=0 for n larger than 4 or 5, this means that the computations can be performed efficiently.

Figure 5:
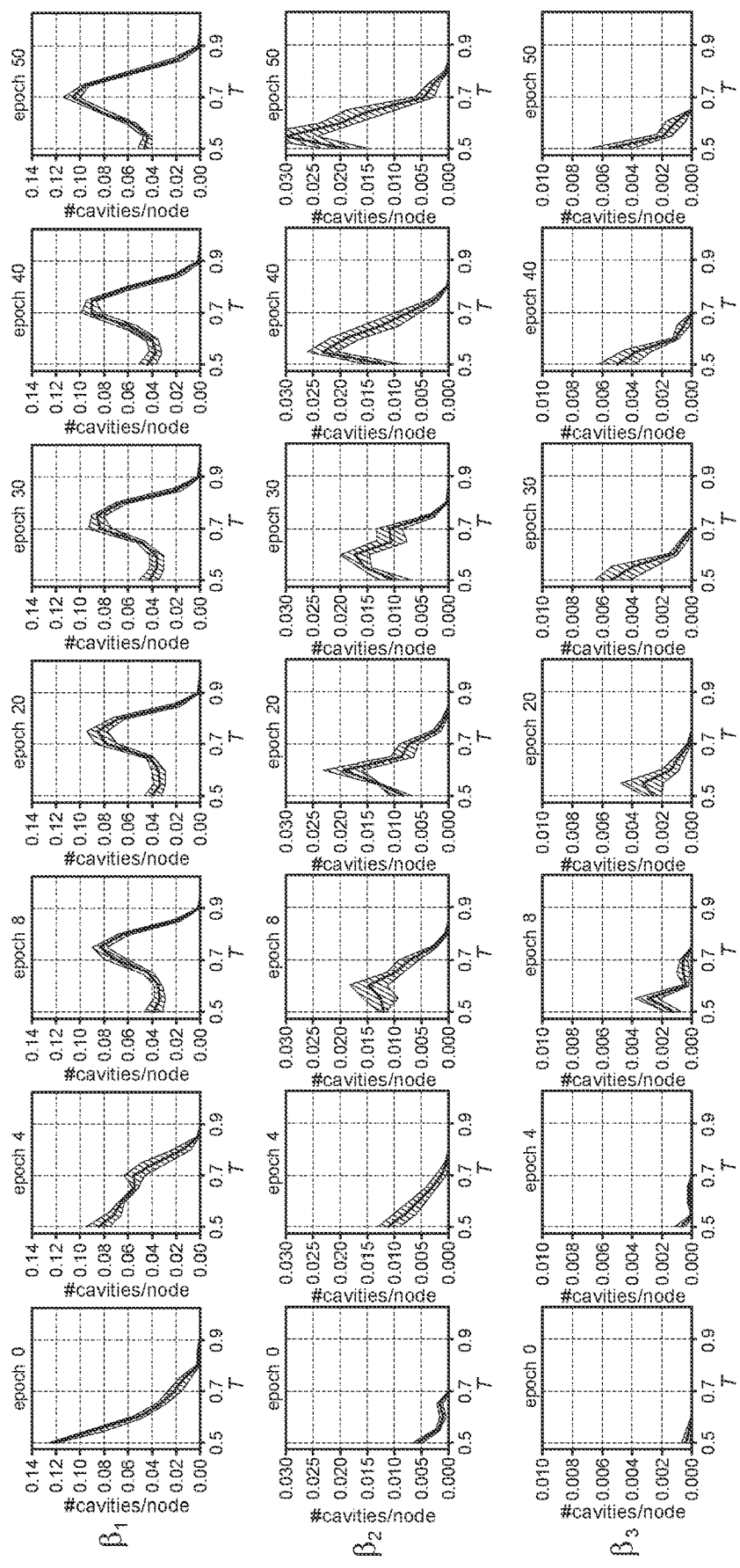
FIG. 5 is an illustration of an embodiment using topological tools to show an evolution of Betti numbers in accordance with aspects of the innovation.

It is to be appreciated that one form of "learning" is memorization, but that this form of learning for DNNs is not desired and leads to inefficiencies and errors of computing systems being easily tricked. For learning in computing systems, a form of learning labeled generalization is thus preferred. In an embodiment, using topological tools, an evolution of the Betti numbers (for example, shown in the LeNet network example above) as a function of and epochs is illustrated in the sets of graphs of FIG. 5. As discussed herein in the disclosed approach, defines the density being explored, i.e., is inversely proportional to (as can be seen in algorithm 1). The graphs presented in FIG. 5 have the y-axis of the plots indicating the number of cavities properly normalized by the number of nodes (i.e., number of cavities/node).

As we can see in the figure, the number of 1D cavities moves from higher to lower densities as the DNN learns. That is, as the DNN learns, the correlation pattern of activation of the nodes in the network that are further apart as well as those that generate larger simplicial complexes start to appear. This effect is captured with the use of topological tools that show that due to the nodes working together, cliques whose simplices fill in the holes of the functional graph start to form. That is, rather than adding additional nodes when increasing the density from $\rho_k$ to $\rho_{k+1}$, edges between the nodes already available at density $\rho_k$ are added. This is referred to as a global property, because rather than having a chain of semi-related nodes (e.g., $v_1 \rightarrow v_2 \rightarrow \ldots \rightarrow v_r$), n-cliques (i.e., all nodes connected to all other nodes) are obtained. It is to be appreciated that the cliques appearing at higher densities delete the cavities observed at lower densities (as can be seen in FIG. 3). The topological structure demonstrates that the network is constructing global structures to learn the function that maps the input samples to their corresponding outputs, $y_i = g(x_i)$, i.e., the network is learning to generalize by using large portions of the graph.

In the embodiment, it is to be appreciated that when the network can no longer generalize, it starts to memorize the samples that do not abide by the learned functional mapping $g(\cdot)$. This results in a decrease of global structure and an increase in local chain complexes (as is clearly visible in FIG. 5, noting the maximum number of cavities starts to move toward higher densities—occurring after about epoch=40, when the network has done all it can to learn to generalize, as correlated with FIG. 4A). Embodiments demonstrating this topological effect are illustrated in the second and third rows of FIG. 3.

It is to be appreciated that aspects of the innovation reveal that learning in DNNs may be equivalent to finding a smallest density $v_k$ of nD cavities in a set of functional binary graphs that define the example network. An embodiment of the innovation uses this peak density to identify when a network has reach its limits of global learnability and generalization, which has practical applications to processing of unseen samples.

This approach is summarized as described with Algorithm 2:

---
Algorithm 2 Generalization.
---
1: Let G = (V, E) define a DNN with θ its parameters.
2: Let X be the training set, and set T > 0.
3: Set t=0, and n to either 1, 2, or 3.
4: repeat
5:   Use X and the selected loss to optimize θ.
6:   t=t+1.
7:   Use Algorithm 1 to obtain $G_k$, k = 1, . . . , r.
8:   Compute the clique complexes $S_k$ of $G_k$.
9:   $\hat{k}_t$ = arg max$_k$ $\beta_n(S_k)$.
10: until $\hat{k}_t > \hat{k}_{t-1}$.
---

Global properties may be found with Algorithm 2, setting n=1 to detect 1D cavities. Even larger topological connections may be identified by setting n=2 or 3. Hence, the ability to use larger n values shows the capability in determining increasingly general properties of the underlying, unknown function g) that a DNN may need to learn. The smaller n that is chosen, the greater adaptability provided to the DNN to adapt to a specific dataset. Thus, a smaller n will yield more accurate results on a testing set that is representative of the training associated with the DNN, but less accurate results on test sets that diverge from such training.

Figure 6A:
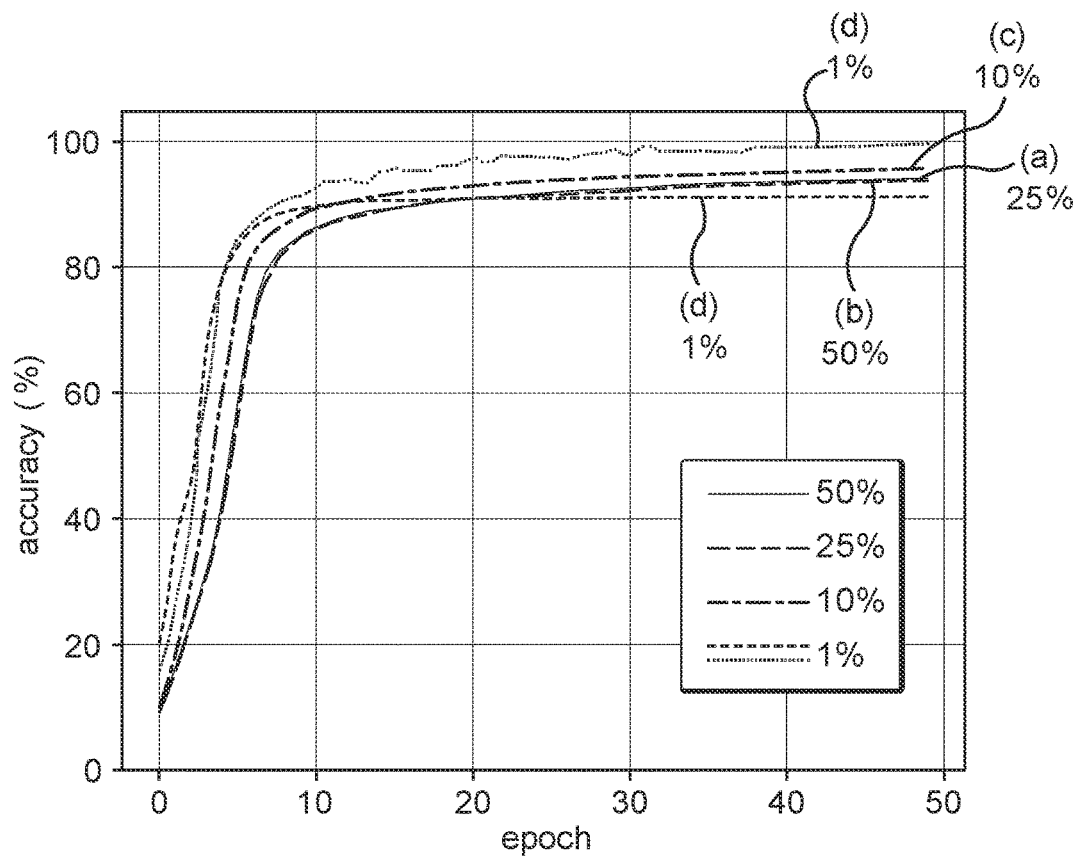
FIGS. 6A and 6B provide an example illustration of training/testing accuracy with a decreasing proportion of training data and permuted/non-permuted labels in accordance with aspects of the innovation.
Figure 6B:
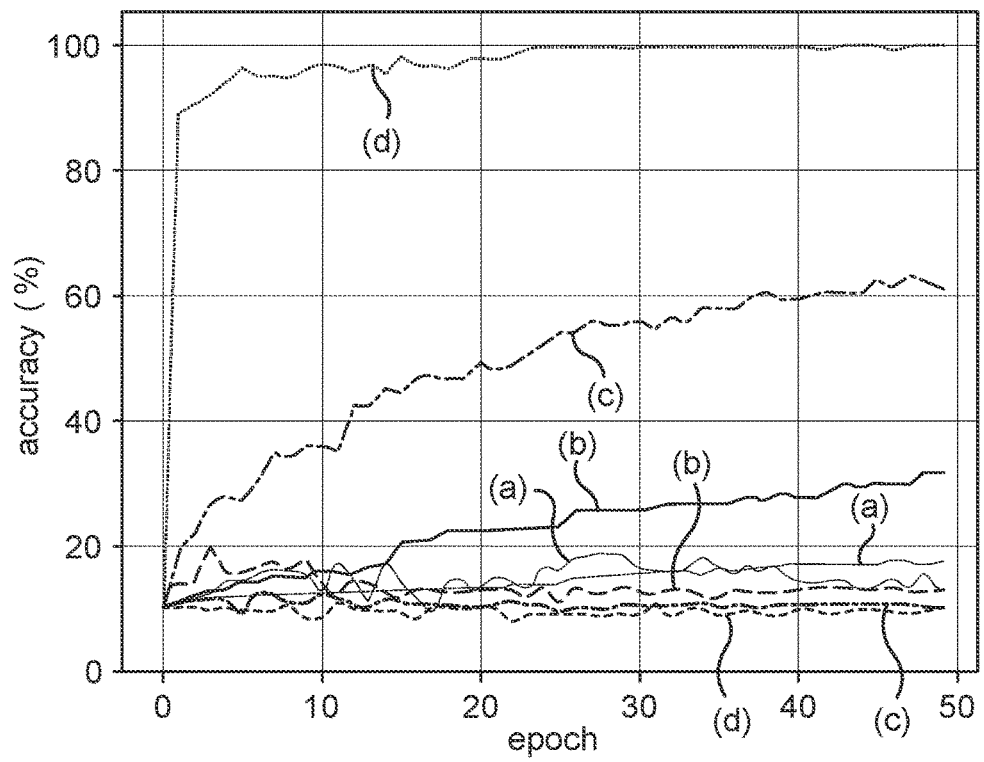

Turning now to FIGS. 6A and 6B, training/testing accuracy with a decreasing proportion of training data and permuted/non-permuted labels is illustrated. It is to be appreciated that the above determined topological properties of a DNN may be used to determine where the networks fails to learn in the sense of generalizing to previously unseen samples. This may be illustrated in an embodiment again using LeNet. In this example, a network may be trained with (for example) any of 50% (a), 25% (b), 10% (c) or 1% (d) random selection of the training samples (plus the data augmentation typically used in LeNet). The training and testing accuracies are shown in FIG. 6A. Solid lines indicate training accuracy; dashed lines testing accuracy. As can be appreciated in the figure, for LeNet the testing accuracy follows the same pattern as the training, regardless of the percentage of training data used.

This is to be contrasted with rerunning the example with permuted labels, which it is to be appreciated would provide results that are very different, as shown in FIG. 6B. This means that the labels $y_i$ have been permuted by multiplying the vector $(y_1, \ldots, y_m)^T$ with a randomly generated m×m permutation matrix P. A permutation matrix may be obtained by permuting the rows of an identity matrix. It is to be appreciated that the embodiment of the innovation provides a network that is able to learn from small nonsensical (permuted) datasets during training. An aspect of the innovation is to be able to distinguish a false sense of learning (as may be presented by a DNN undergoing a memorization method). The testing as indicated with algorithm 2 and FIGS. 6A and 6B would reveal, through the testing accuracy curves, that memorization methods are indicated as just an illusion, i.e., a network able to memorize these nonsensical sample pairs $\{x_i, \tilde{y}_i\}$, where $\tilde{y}_i$ are the permuted labels would be captured, highlighting a purpose when it comes to testing the performance of a system on independent samples (independent from any set of training samples). It is to be appreciated how the disclosed innovation verifies that conventional measures of training accuracy do not serve well as a measure of the form of learning known as generalization.

As discussed previously, the disclosed innovation provides that nD cavities move toward lower densities of functional binary graphs indicating when a network learns by generalizing. It is to be appreciated that this insight provides practical application of being able to derive a simple algorithm to verify whether the network is learning (by generalization) or not.

Figure 7A:
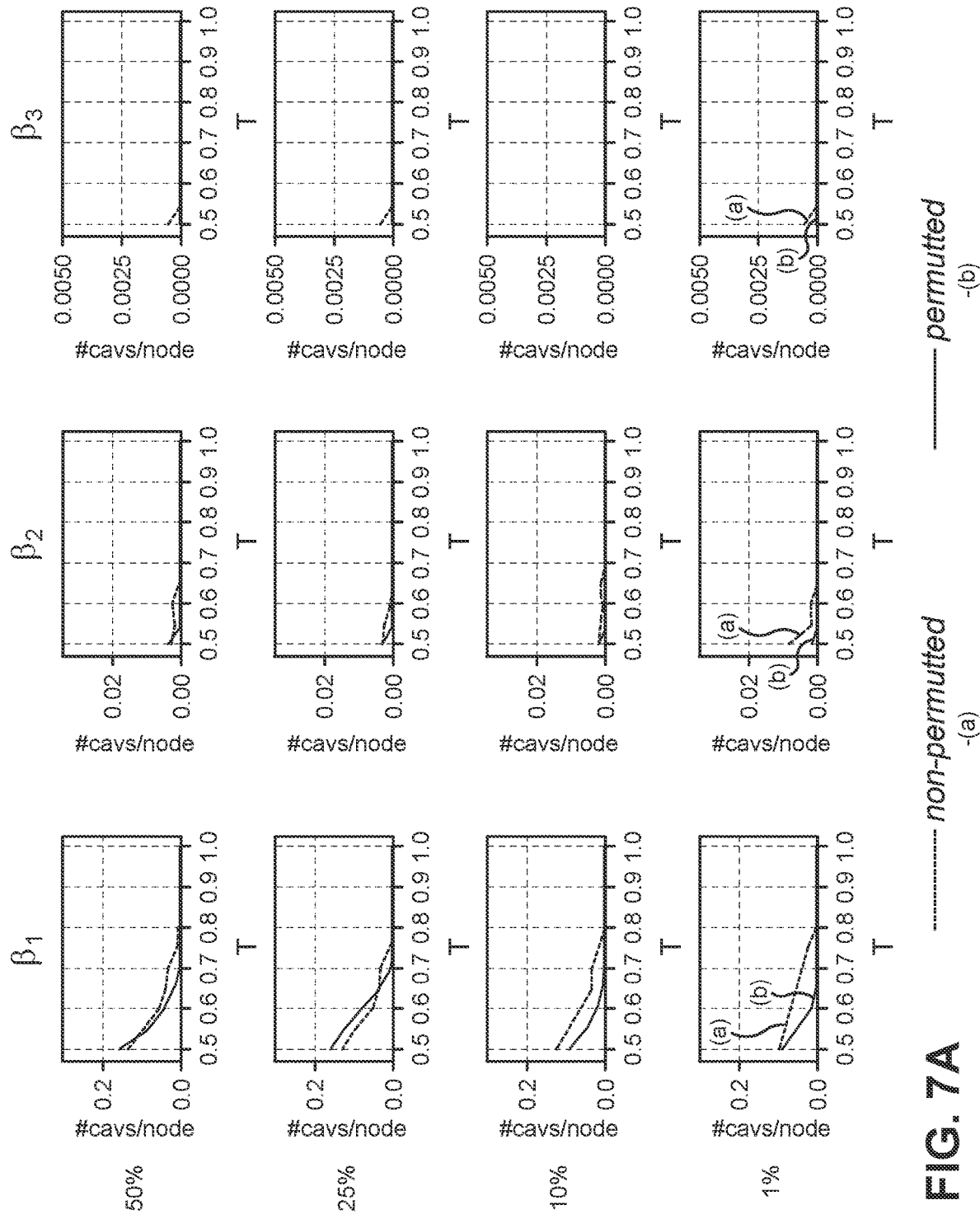
FIGS. 7A through 7D provide example illustrations of Betti numbers at different densities in accordance with aspects of the innovation.
Figure 7B:
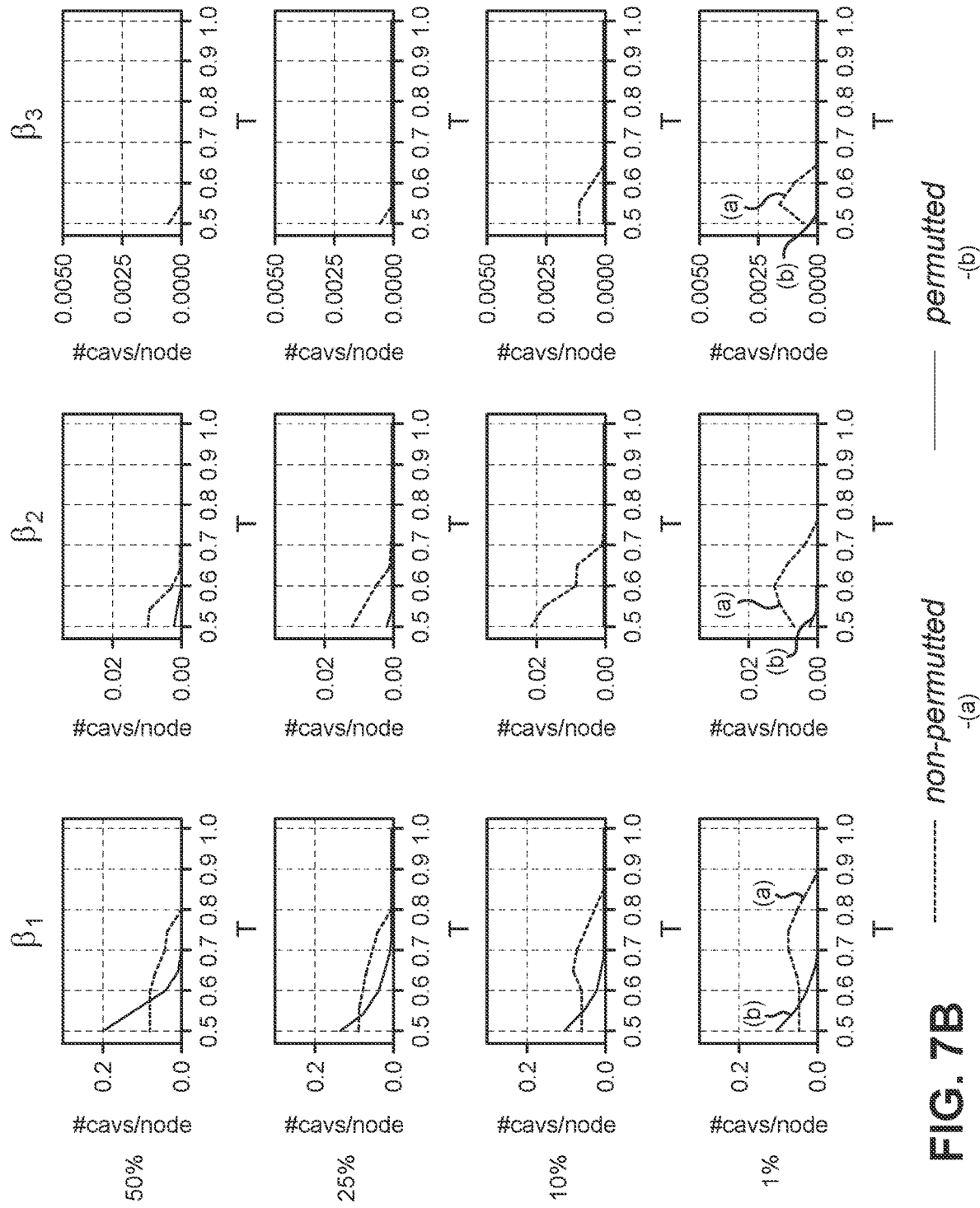
Figure 7C:
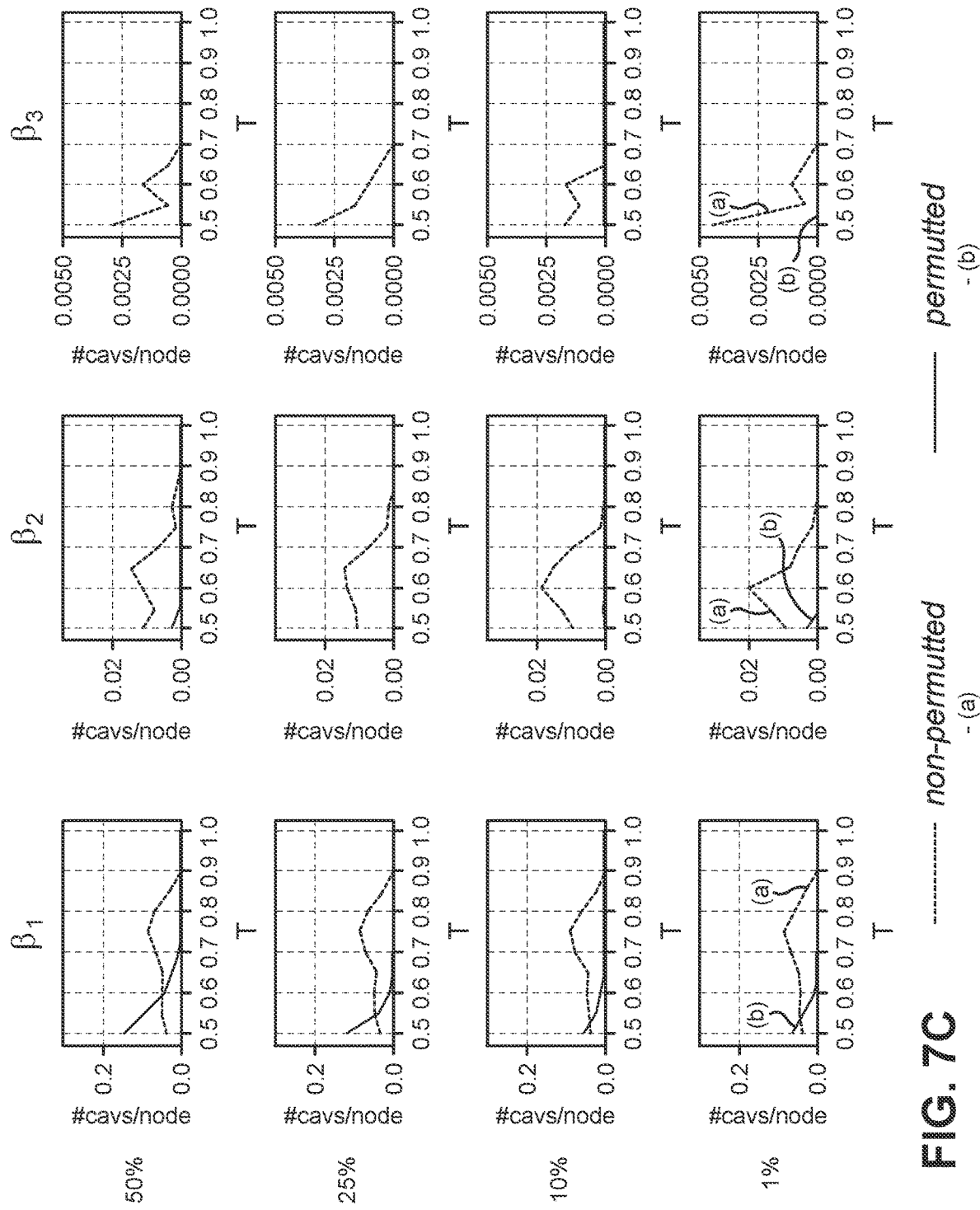
Figure 7D:
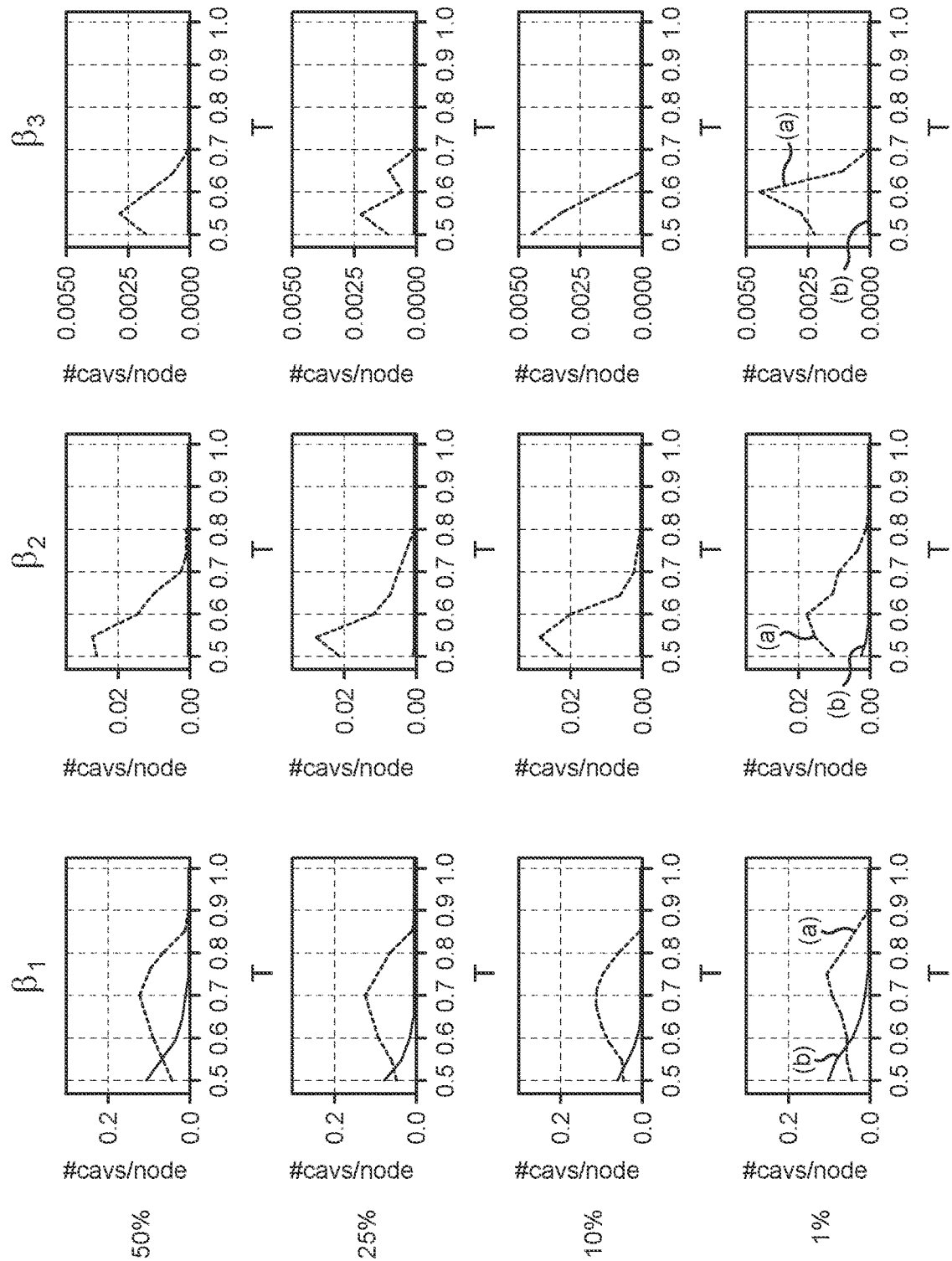

Turning to FIGS. 7A through 7D, Betti numbers at different densities are presented in an embodiment, with percentages of training data (50 to 1%), and epochs (epoch=2, 10 and 50). The (a) curves correspond to the Betti numbers computed with Algorithm 2, as discussed previously, and non-permuted data. Curves (b) show the Betti numbers obtained when using the permuted labels $\tilde{y}_i$. FIG. 7A presents the results at epoch=2, FIG. 7B presents the results at epoch=4, FIG. 7C presents the results at epoch=10 and FIG. 7D presents the results at epoch=50. Betti numbers were obtained using 50%, 25%, 10% or 1% of the training data (top to bottom row, respectively). Curves (a) indicate non-permuted labels; curves (b) indicate permuted labels. 1D cavities ($\beta_1$) are shown in the first column; 2D cavities ($\beta_2$) in the second column; and 3D cavities ($\beta_3$) in the third column. Results plotted at the following epochs c. 2, d. 4, e. 10 and f. 50.

As portrayed, the embodiment of the innovation reveals that the maximum number in $\beta_1$ moves to lower densities when the labels are non-permuted, but does not when the labels are permuted. Even more telling is the lack of 2D and 3D cavities when using permuted labels. The embodiment of algorithm 2 thus may determine a lack of training in contexts of: a. Lack of 2D and 3D cavities, and b: 1D cavities move toward lower densities.

In an embodiment, to have a DNN learn (learning to generalize) is defined by the creation of 2 and 3D cavities in the functional binary graphs representing the correlations of activation of distant nodes of the DNN, and the movement of 1D cavities from higher to lower graph density $\rho$. Overfitting may be indicated by a regression of these cavities toward higher densities in these functional binary graphs.

Figure 8:
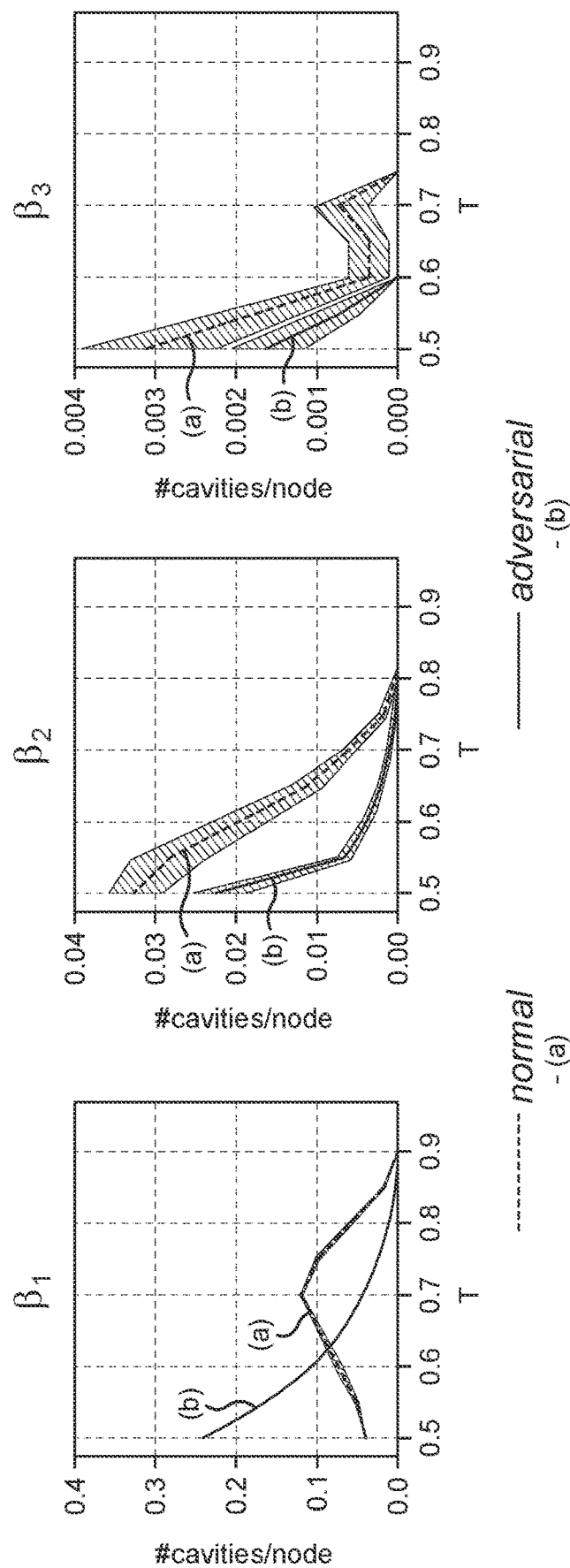
FIG. 8 discloses an embodiment of the innovation with an aspect of detecting adversarial attacks.

Turning now to FIG. 8, an embodiment of the innovation with an aspect of detecting adversarial attacks is disclosed. Having disclosed the ability of the innovation to determine where a network may be likely to fail during testing, especially with previously unseen testing samples, the innovation can be run with a known adversarial attack, which for conventional DNNs would be a guaranteed, easy way to make the conventional DNN fail. FIG. 8 shows Betti numbers obtained when using unaltered and adversarial testing samples. In an example, generated images (as may be known in the art for an adversarial attack on a trained LeNet, with, as above, LeNet trained on MNIST) may be used post-training on a DNN. In this example testing, the independent MNIST testing set and the set of images prepared for the adversarial attack were used.

As above, we expect 1D cavities to increase and move to lower densities as well as an increase in the number of 2 and 3D cavities at lower densities on unaltered testing data. But for the data in the adversarial set, we expect only 1, 2 and 3D cavities at the highest densities, indicating local processing but a lack of global engagement of the network, stemming from the fact that the images provide a known adversarial attack. As shown in FIG. 8, with the (a) curves indicating the cavities on the functional binary graphs $G_k$ when using the unaltered testing sample, and the (b) curve those observed when processing the samples in the adversarial attack set. The figures highlight the discussions previously, confirming the use of the embodiment of the disclosed innovation can confirm the predictions as the images in the adversarial attack set cannot be correctly classified by LeNet. This approach provides for the practical application to identify test images that the network is bound to misclassify.

The details of the example experiment as shown in FIG. 8 use LeNet trained using stochastic gradient descent with momentum of 0.9 and weight decay $5 \times 10^{-4}$. Learning rate was initialized at $10^{-4}$ and reduced by half when accuracy stagnated. For training, data was augmented using random horizontal flips, random rotations of ±5 and random crops of equal image size with padding=4. The images of the adversarial attack were generated using an approach known in the art, which computes minimal perturbations, that are mostly indistinguishable to a human observer but have devastating effects on conventional DNNs. It is to be appreciated that with an embodiment of the disclosed innovation, the initial testing accuracy was above 90% with a graph as discussed in relation to FIG. 4A dropping a random decision to 10% after the adversarial perturbations were used.

By defining what learning in deep networks means and introducing a set of tools and algorithms to address problems of conventional DNNs, it is to be appreciated that the disclosed innovation in a number of embodiments provide practical applications for at least the main problem with conventional DNNs: their "black-box" behavior (i. e., not knowing how the DNN learns, what the DNN learns, or where these learned deep representations will fail). The improvements disclosed may be utilized in a large number of real life products, including face recognition, facial expression analysis, object recognition, speech recognition, and language translation, to name but a few. It is to be further appreciated that with many companies depending on DNNs to design their products, practical applications of the disclosed innovation include embodiments of improved reliability for researchers that may depend on DNNs to conduct some of their research. Loss of trust for researchers may be provided with clear examples, such as self-driving cars and medical diagnoses, with variants of the following arguments for researchers: If we do not know what the network learned and why and where it will fail, how can I trust it to drive my car or give me a medical diagnosis. We know the system will fail. Will I be the victim of one of these failures?

Specifically, it is to be appreciated that embodiments of the disclosed innovation provide learning to generalize to unseen (test) samples as being equivalent to creating cliques among large number of nodes, whereas memorizing specific training samples (i.e., a type of learning that does not translate to good generalizations) is equivalent to topological changes between low-correlated sets of nodes (i.e., nodes that are not highly cooperative among themselves). The disclosed innovation, in various embodiments can use these same principles to determine when the network works correctly during testing, as well as reliably identify adversarial attacks in a pre- or post-testing environment.

It is to be appreciated that the disclosed innovation may be applied to a variety of DNNs and is not limited to particular networks that may employ feedforward neural networks or the use of backpropagation. The disclosed innovation works equally well on networks that have most all types of directed and undirected edges (in the structure of the computing systems), including those that may use recently derived alternative to backpropagation.

In another embodiment, aspects of the innovation are illustrated with replications with another DNN, that of VGG16. It is to be appreciated that a similar experimental setup (as discussed in view of FIG. 8), including identical learning rate, weight decay, momentum, and the like. In this embodiment, a CIFAR10 dataset is used. CIFAR10 consists of 60,000 training images and 10,000 separate test images labelled with 10 different classes. These are natural images representing common objects (e.g., dog, cat, airplane). For training, data was augmented using random horizontal flips and random crops of equal image size with padding=4. All data was resized to 32×32 pixels and mean and variance were normalized.

Figure 9A:
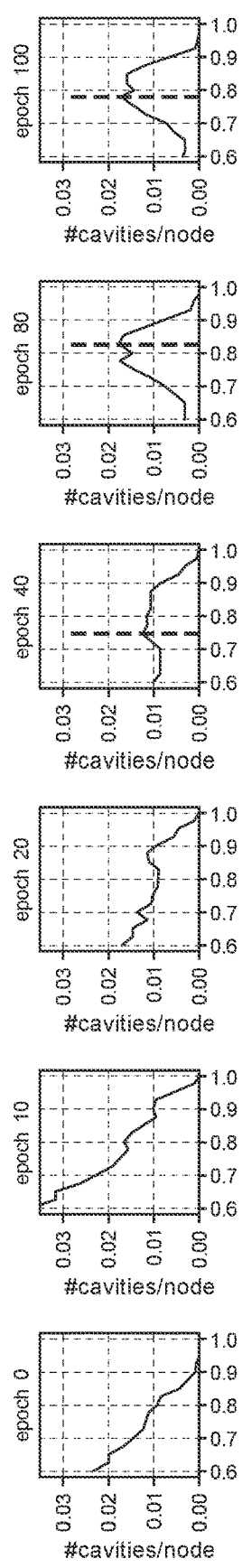
FIGS. 9A and 9B illustrate results of the embodiment discussed in regards to FIG. 8.
Figure 9B:
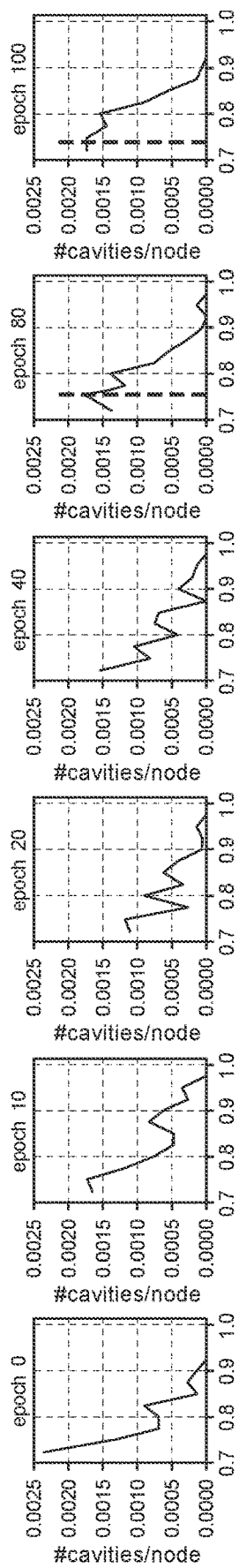

Turning to FIGS. 9A and 9B, the results of this embodiment are illustrated. The first row (FIG. 9A) shows the number of 1D cavities as a function of the density of the functional binary graph representing VGG16. Different plots specify these numbers at distinct epochs. The second row (FIG. 9B) does the same but for 2D cavities. The figures how the number of normalized 1D cavities (y-axis) as a function of graph density (x-axis) and number of epochs (given at the top of each plot). It is to be appreciated that the maximum number of 1D and 2D cavities (indicated by a dashed vertical line) moves toward less dense functional representations of the VGG16, as described herein in relation to algorithm 2. The lowest density is achieved at epoch 80. After that, there is a small regression toward higher densities, suggestive of overfitting. These results are confirmed by the plot of the testing accuracy shown in FIG. 10.

Figure 10:
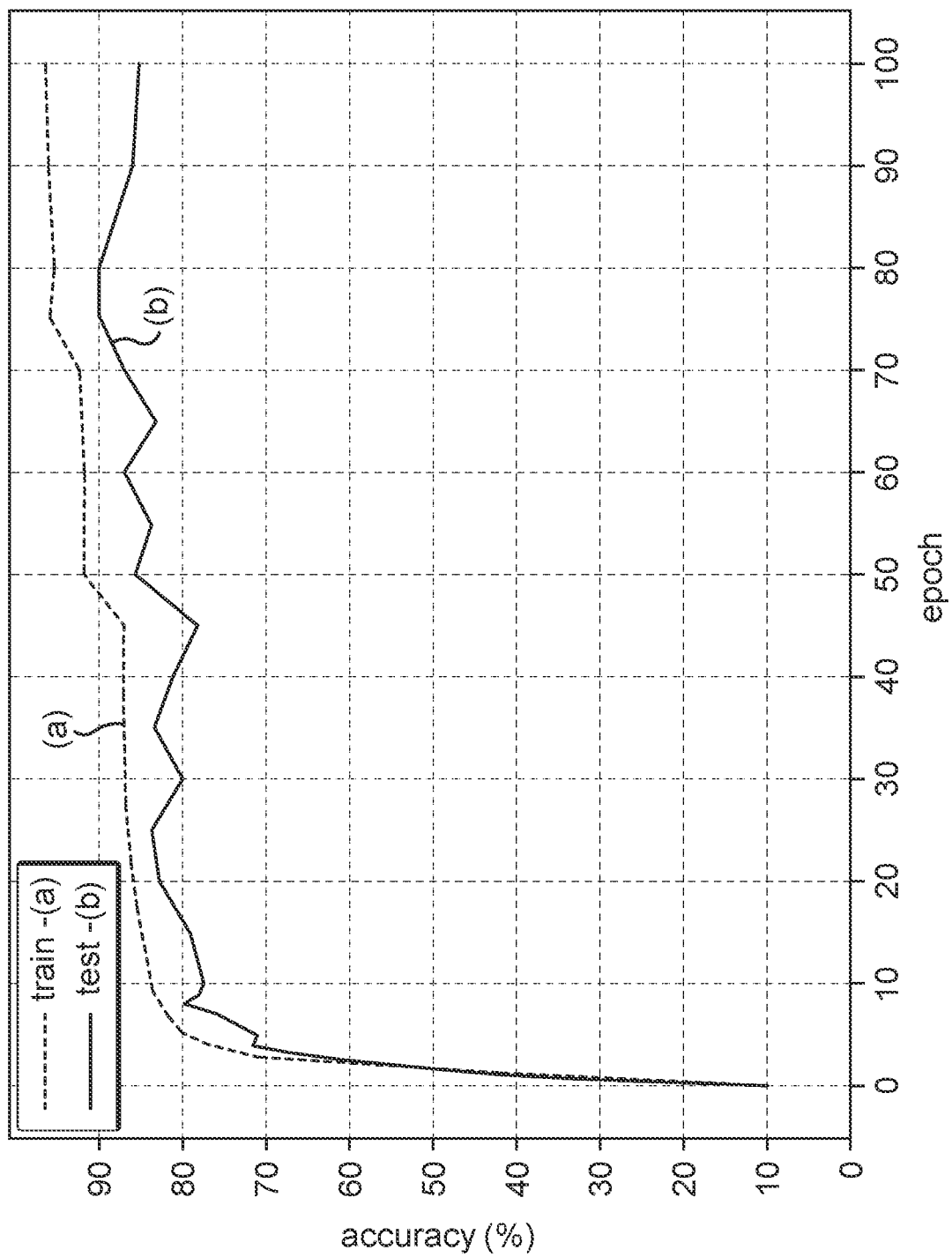
FIG. 10 illustrates example results of training and testing accuracy in accordance with aspects of the innovation.

In FIG. 10, portrayed are results of VGG16 training and testing accuracy on CIFAR10 as a function of training epochs. It is to be appreciated that while the training accuracy keeps growing after epoch 80, the testing accuracy does not. Instead, the testing accuracy slightly decreases after epoch 80, as suggested by in the discussion of aspects of the innovation.

Figure 11:
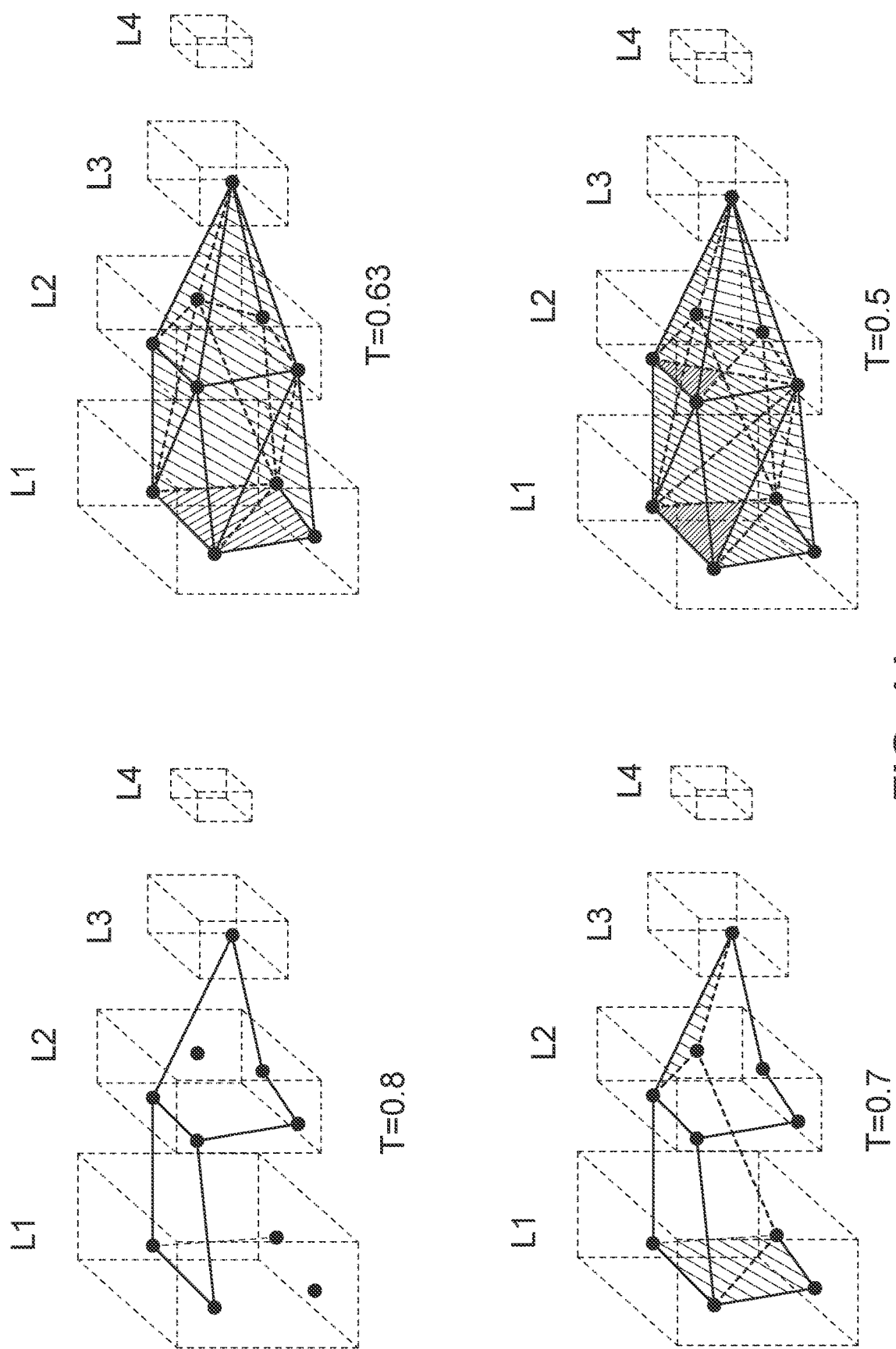
FIG. 11 illustrates cavity formation associated with learning through DNN generalization in accordance with aspects of the innovation.

In an embodiment, we turn to FIG. 11 to illustrate cavity formation associated with learning through DNN generalization. Cavities may be given by binary graphs defining the correlation of activation of the nodes of the DNN. This embodiment is provided for additional clarification of cavity formation, and is illustrated with a selected set of nodes of the LeNet DNN with example of 1D, 2D and 3D cavity formation in LeNet trained on MINST.

In this figure, formation of 1D cavities can be seen first, followed by formation of 2D cavities, and, finally, formation of a 3D cavity (second to last binary graph). It is to be appreciated that cavities are formed as the density of the binary graph is increased. In the lower right-most graph, further increasing the density can be seen to eliminate cavities.

This particular example is for the activation graph formed at epoch 20. Layers are over-imposed to show location in the network. The location within the layer is chosen for the best visual effect. By increasing density (i.e., decreasing T), more and more edges are added to the graph. Specifically, at T=0.8, a couple of 2D cavities form. These contribute to an increase in $\beta_1$. At exactly T=0.63 a 3D cavity is realized between these, resulting in an increase to $\beta_2$. This cavity is filled at higher densities (T=0.5).

Figure 12A:
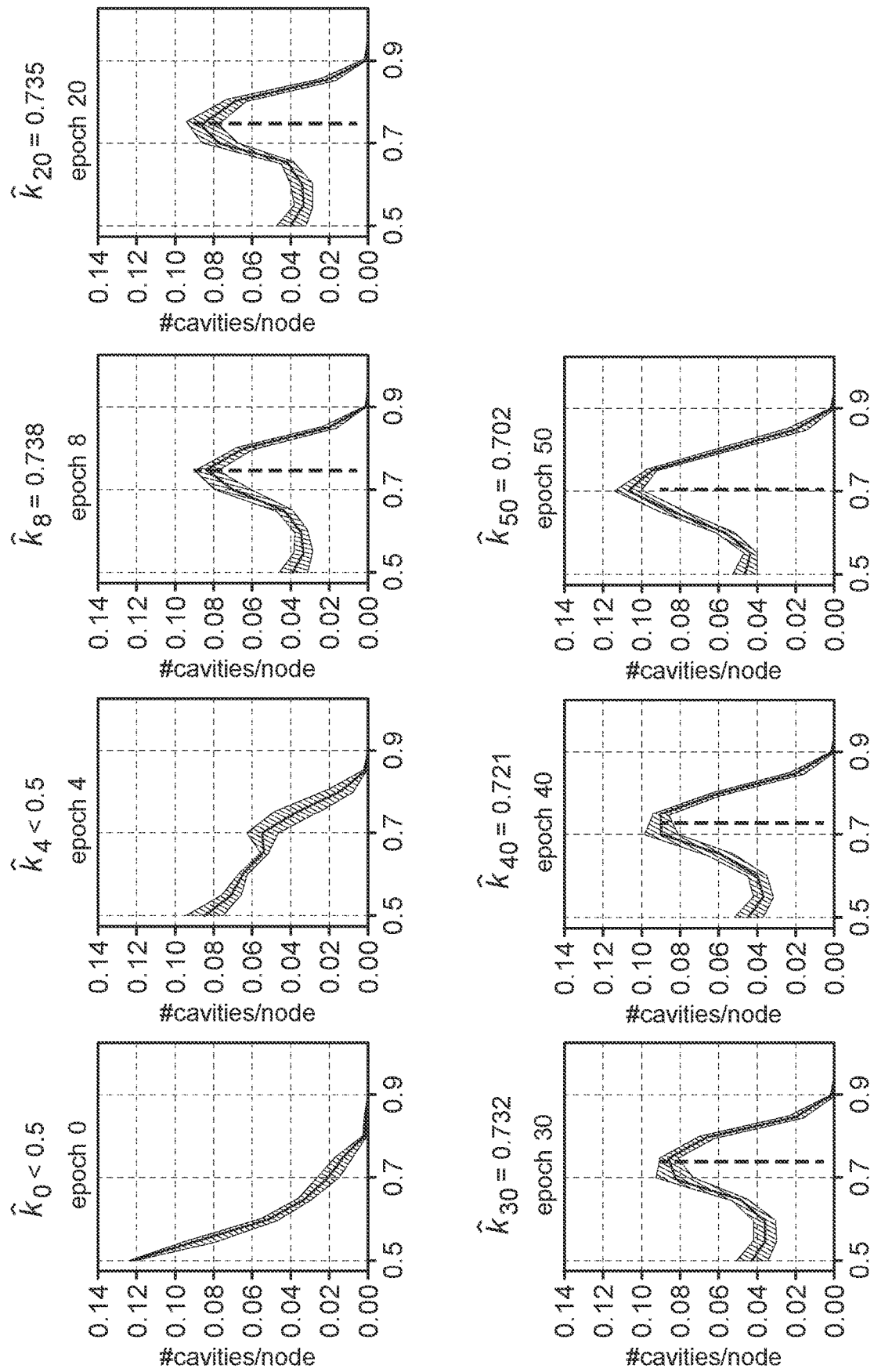
FIGS. 12A and 12B illustrate an embodiment of the innovation that portrays a measure of learning by generalization in accordance with aspects of the innovation.
Figure 12B:
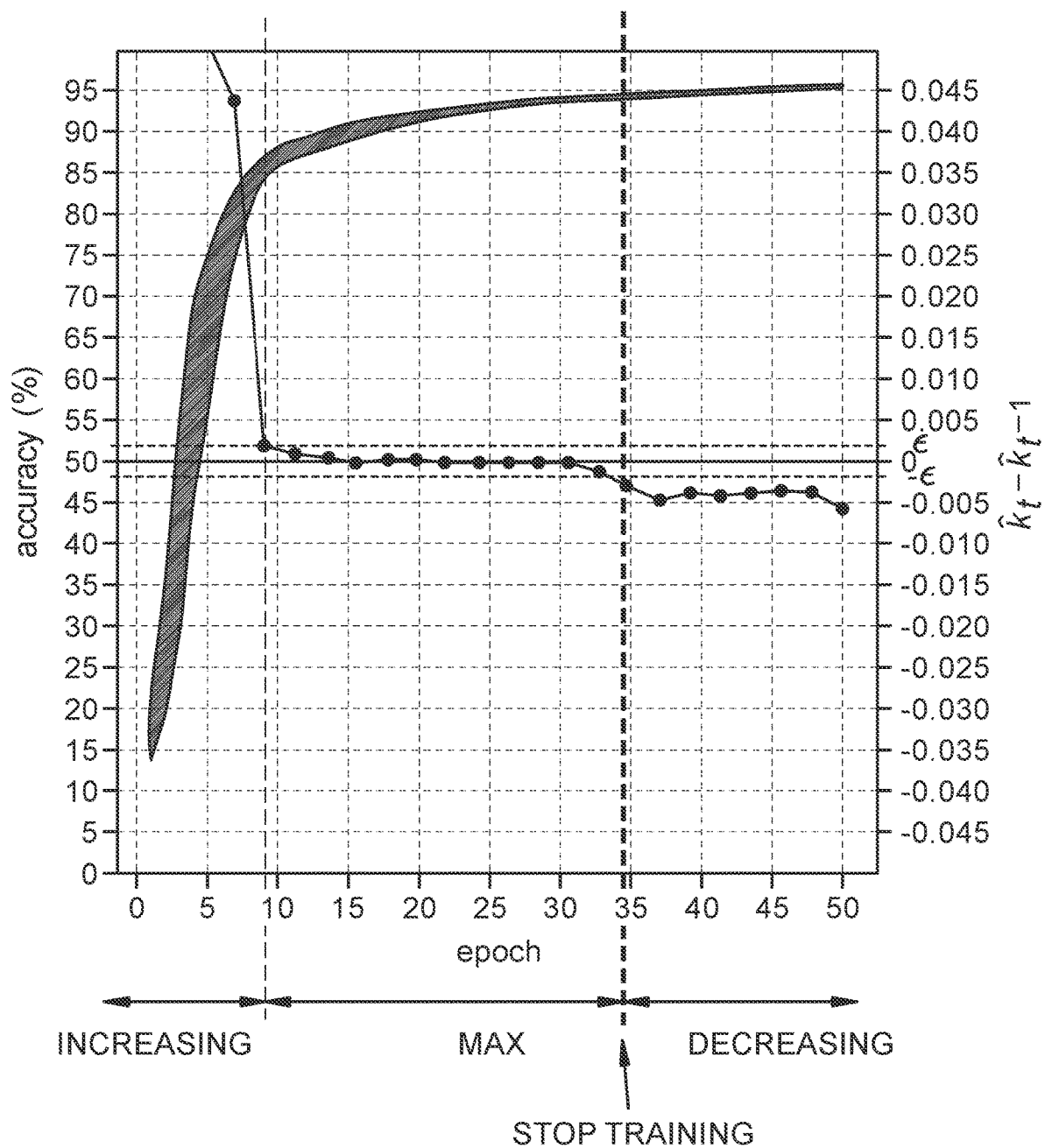

An embodiment of the innovation is illustrated in FIG. 12A that portrays a measure of learning by generalization. In an approach that uses Betti numbers to reflect DNN training rather than a conventional approach of using training or verification error methods, portrayed is an illustration of algorithm 2 for n=1. As discussed herein, algorithm 2 may be used to determine when a network has learned to generalize and before the network overfits to a set of training data. FIG. 12B shows a testing classification accuracy (curved lines) and a difference of the peak densities at epoch t and t−1 (line with dots). Classification accuracies are given on the lefty-axis and values of $\Delta k = \hat{k}_t - \hat{k}_{t-1}$ are on the righty-axis. It is to be appreciated that when $\Delta k$ is beyond a small threshold −ϵ, Algorithm 2 decides to stop training. As shown in the figure this stopping point coincides with a point where generalization is achieved (thick vertical line in the figure). After that, the network starts to memorize the samples that do not generalize. Specifically, given $\Delta k$, three dynamic regimes for $\hat{k}$ can be clearly observed. Initially, in the first epochs $\hat{k}$ increases rapidly, it then reaches a maximum value between epochs 8 and 32 and then it starts decreasing in the later stage of training. It is to be appreciated that this result provides that even in the absence of a verification set, the disclosed innovation provides a point at which training should stop. It is to be appreciated that a practical application of this aspect may involve unsupervised learning of DNNs.

While for purposes of simplicity of explanation, the methods may be described as a series of blocks, it is to be understood and appreciated that the claimed subject matter is not limited by the order of the described blocks, as some blocks may occur in different orders and/or concurrently with other blocks from what is described herein. Moreover, not all described blocks may be required to implement the methods described hereinafter.

While not pictured, still another embodiment involves a computer-readable medium including processor-executable instructions configured to implement one or more embodiments of the techniques presented herein. It is to be appreciated that an implementation may include a computer-readable medium, such as a readable compact disc (CD-R), Digital Versatile Disk (DVD-R), flash drive, a platter of a hard disk drive, etc., on which is encoded computer-readable data. This computer-readable data, such as binary data including a plurality of zero's and one's, in turn may include a set of computer instructions configured to operate according to one or more of the principles set forth herein. In one such embodiment, processor-executable computer instructions may be configured to perform a method, such as methods disclosed herein. In another embodiment, processor-executable instructions may be configured to implement a system, such as systems disclosed herein. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or most any combination thereof to control a computer to implement the disclosed subject matter. The term "article of manufacture" as used herein is intended to encompass a computer program accessible from most any computer-readable device, carrier, or media. The disclosed innovation is contemplated to be provided in other implementations (for example, as a dedicated hardware ASICS). Of course, many modifications may be made to this configuration without departing from the scope or spirit of the claimed subject matter.

Although, in accordance with some aspects, the subject matter has been described herein in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. For features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A computing system comprising:
   a receiving module that receives an input to be analyzed;
   a plurality of deep neural network (DNN) sets that are applied to the received input; and
   an algorithm engine that: (i) creates functional graphs of the plurality of DNN sets and applies binary translation to the functional graphs based on use of topological structures, and (ii) analyzes both local and global topological properties of the plurality of DNN sets, wherein analyzing the local and global topological properties includes determining limits of global learnability and generalization of each DNN of the plurality of DNN sets based on a density of a corresponding functional graph;
   wherein analysis of the local and global topological properties of the plurality of DNN sets is used to determine a learning structure of the plurality of DNN sets for detection and circumvention of adversarial attacks on the computing system.

2. The computing system of claim 1, wherein the use of topological structures comprises: (i) correlating an activation of a plurality of sets of distant nodes of the plurality of DNN sets, and (ii) using Betti numbers to determine topological cavity structure formation.

3. The computing system of claim 2, wherein the topological structures comprise at least n-cliques and nD holes.

4. A method of determining mimicked generalization through topologic analysis for advanced machine learning, the method comprising:
   receiving a deep neural network (DNN);
   creating a weighted graph based on the DNN;
   tracking activation of nodes of the DNN based on a correlation of activation of node pairs;
   configuring a computed structure based on a functional graph of the correlation of activation of node pairs, wherein configuring the computed structure includes determining limits of global learnability and generalization of the DNN based on a density of the functional graph; and
   detecting adversarial attacks through the computed structure and evaluation of a plurality of formed topological objects, wherein weighted graphs are mapped to binary graphs that represent topological properties of the DNN as a function of learning.

5. The method of claim 4, wherein accuracy is shown by cross-validation classification of the received DNN.

6. The method of claim 4, wherein the limits of global learnability and generalization provide training divergent indicators.

7. The method of claim 6, wherein the training divergent indicators comprise permuted/non-permuted labels that indicate where the DNN fails to learn by generalization.

8. The method of claim 7, wherein a failure to learn by generalization is defined by topological structural characteristics comprising Betti numbers and the density of the functional graph.

9. The method of claim 8, wherein the failure to learn is associated with identification of test images that the DNN is likely to misclassify, wherein the test images are provided as inputs to the DNN.

10. A non-transitory computer readable medium storing computer-executable instructions that, when executed by a computer, cause the computer to:
    receive a deep neural network (DNN);
    create a weighted graph of the DNN;
    track activation of nodes of the DNN based on a correlation of activation of node pairs;
    configure a computed structure based on a functional graph of the correlation of activation of node pairs, wherein configuring the computed structure includes determining limits of global learnability and generalization of the DNN based on a density of the functional graph; and
    detect adversarial attacks through the computed structure and evaluation of a plurality of formed topological objects, wherein weighted graphs are mapped to binary graphs that map a topological property of a DNN as a function of learning.

11. The non-transitory computer readable medium of claim 10, wherein accuracy is shown by cross-validation classification of the received DNN.

12. The non-transitory computer readable medium of claim 10, wherein the limits of global learnability and generalization provide training divergent indicators.

13. The non-transitory computer readable medium of claim 12, wherein the training divergent indicators comprise permuted/non-permuted labels that indicate where the DNN fails to learn by generalization.

14. The non-transitory computer readable medium of claim 13, wherein a failure to learn by generalization is defined by topological structural characteristics comprising Betti numbers and the density of the functional graph.

15. The non-transitory computer readable medium of claim 14, wherein the failure to learn is associated with identification of test images that the DNN is likely to misclassify, wherein the test images are provided as inputs to the DNN.

* * * * *